US012763842B2

(12) United States Patent
Saab et al.

(10) Patent No.: US 12,763,842 B2
(45) Date of Patent: Oct. 13, 2026

(54) RECONFIGURABLE INTELLIGENT SURFACES (RIS) ASSISTED LINE-OF-SIGHT (LOS) MULTIPLE-INPUT MULTIPLE-OUTPUT (MIMO) FOR RANGE EXTENSION AT TERAHERTZ (THZ)

(71) Applicant: Samsung Electronics Co., Ltd., Suwon-si (KR)

(72) Inventors: Sandy Saab, Plano, TX (US); Shadi Abu-Surra, Plano, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 18/167,016

(22) Filed: Feb. 9, 2023

(65) Prior Publication Data

US 2023/0344506 A1 Oct. 26, 2023

Related U.S. Application Data

(60) Provisional application No. 63/334,453, filed on Apr. 25, 2022.

(51) Int. Cl.
*H04B 7/145* (2006.01)
*H01Q 15/14* (2006.01)

(52) U.S. Cl.
CPC ............. *H04B 7/145* (2013.01); *H01Q 15/14* (2013.01)

(58) Field of Classification Search
CPC .. H04B 7/145; H04B 7/0617; H04B 7/04013; H04B 7/0695; H04B 7/0632;
(Continued)

(56) References Cited

U.S. PATENT DOCUMENTS

2014/0242918 A1* 8/2014 Weissman ............. H04W 16/28
2015/0194999 A1 7/2015 Lea et al.
(Continued)

FOREIGN PATENT DOCUMENTS

CN 113258980 A 8/2021
CN 113746578 A * 12/2021 ............ H04W 24/02
(Continued)

OTHER PUBLICATIONS

International Search Report and Written Opinion issued Jun. 26, 2023 regarding International Application No. PCT/KR2023/004405, 9 pages.
(Continued)

*Primary Examiner* — Lana N Le

(57) ABSTRACT

A method, implemented by a processor connected to a reconfigurable intelligent surface (RIS) system that includes one or more RISs, includes detecting one or more wireless control signals from a transmitter. The method includes identifying a channel state and one or more phases based on the detected wireless control signals; improving a beam-steering reflection matrix (Φ) of the RIS system based on a singular value decomposition of channel matrices; and configuring the RIS system based on the Φ. Among the RISs, each RIS is configured to redirect an incident signal toward an antenna array of an intended receiver. The incident signal is received from the transmitter. Locations of the RIS and transmitter differ by a height placement value ($h_{RIS}$). In a horizontal plane, the location of the RIS is a first distance ($D_{TX-RIS}$) from the transmitter and a second distance ($D_{RX-RIS}$) from the receiver.

20 Claims, 10 Drawing Sheets

(58) Field of Classification Search
CPC .. H04B 10/5561; H04B 7/088; H04B 7/0623; H04B 7/04026; H04B 7/043; H04B 7/0408; H04B 7/0452; H04B 17/347; H04B 17/318; H04B 17/103; H01Q 15/14; H01Q 15/148; H01Q 1/246; H01Q 3/04; H01Q 19/10; H04W 16/28; H04W 72/046
See application file for complete search history.

(56) References Cited

U.S. PATENT DOCUMENTS

| | | | | |
|---|---|---|---|---|
| 2018/0343044 | A1* | 11/2018 | Athley | H04B 7/0408 |
| 2020/0028262 | A1* | 1/2020 | Fang | H04B 7/145 |
| 2020/0136689 | A1* | 4/2020 | Bisiules | H04B 7/0617 |
| 2021/0013619 | A1 | 1/2021 | Alkhateeb et al. | |
| 2021/0194551 | A1 | 6/2021 | Raghavan et al. | |
| 2021/0384958 | A1 | 12/2021 | Denis et al. | |
| 2022/0014935 | A1 | 1/2022 | Taija et al. | |
| 2022/0059943 | A1 | 2/2022 | Saab et al. | |
| 2022/0077944 | A1 | 3/2022 | Zou et al. | |
| 2022/0123803 | A1 | 4/2022 | Rimalapudi et al. | |
| 2022/0271995 | A1* | 8/2022 | Dai | H04B 7/0617 |
| 2023/0318177 | A1 | 10/2023 | Zhou et al. | |
| 2024/0154647 | A1* | 5/2024 | Elshafie | H04L 5/14 |
| 2024/0405807 | A1* | 12/2024 | Haija | H04B 7/04013 |
| 2024/0413858 | A1* | 12/2024 | McMenamy | H04W 24/10 |
| 2025/0023606 | A1* | 1/2025 | Elshafie | H04B 7/0456 |
| 2025/0240056 | A1* | 7/2025 | Caire | H04B 7/04013 |
| 2025/0324238 | A1* | 10/2025 | Sverdlov | H04W 8/22 |

FOREIGN PATENT DOCUMENTS

| | | | | |
|---|---|---|---|---|
| CN | 113992254 | A | 1/2022 | |
| CN | 114268350 | A | 4/2022 | |
| CN | 114390463 | A | 4/2022 | |
| KR | 10-2022-0046074 | A | 4/2022 | |
| KR | 10-2399977 | B1 | 5/2022 | |
| TW | 202135379 | A * | 9/2021 | H01Q 21/20 |
| WO | 2021207748 | A9 | 11/2021 | |
| WO | 2022057918 | A1 | 3/2022 | |

OTHER PUBLICATIONS

Zhu et al., "Joint Design of Hybrid and Reflection Beamforming for RIS-Aided mmWave MIMO Communications", 2021 IEEE Globecom Workshops (GC Wkshps), Jan. 2022, 6 pages.
Extended European Search Report issued Jun. 17, 2025 regarding Application No. 23796641.1, 9 pages.

* cited by examiner

RECONFIGURABLE INTELLIGENT SURFACES (RIS) ASSISTED LINE-OF-SIGHT (LOS) MULTIPLE-INPUT MULTIPLE-OUTPUT (MIMO) FOR RANGE EXTENSION AT TERAHERTZ (THZ)

CROSS-REFERENCE TO RELATED APPLICATION(S) AND CLAIM OF PRIORITY

This application claims priority under 35 U.S.C. § 119(e) to U.S. Provisional Patent Application No. 63/334,453 filed on Apr. 25, 2022. The above-identified provisional patent application is hereby incorporated by reference in its entirety.

TECHNICAL FIELD

This disclosure relates generally to wireless communication systems. More specifically, this disclosure relates to reconfigurable intelligent surfaces (RIS) assisted line-of-sight (LoS) multiple-input multiple-output (MIMO) for range extension at terahertz (THz).

BACKGROUND 6G technologies use terahertz (THz) communications to address the increasing demand for higher wireless data rates. The THz frequency band falls between 0.1 THz to 10 THz which provides abundant bandwidth and results in data rates that are in the order of Tbps.

Establishing a reliable transmission link at such THz frequency bands, however, is non-trivial. The high atmospheric attenuation and free-space losses can severely degrade the coverage of a THz communication system. At high frequencies, the transmission range shrinks, and the propagation becomes mostly line-of-sight (LoS).

SUMMARY

This disclosure provides reconfigurable intelligent surfaces (RIS) assisted line-of-sight (LoS) multiple-input multiple-output (MIMO) for range extension at terahertz (THz).

In one embodiment, a method for RIS-assisted LoS MIMO for range extension at THz is provided. The method is implemented by a processor operably connected to a reconfigurable intelligent surface (RIS) system that includes one or more RISs. The method includes detecting one or more wireless control signals from a transmitter; identifying a channel state and one or more phases based on the one or more detected wireless control signals; improving a beam-steering reflection matrix (Φ) of the RIS system based on a singular value decomposition of channel matrices; and configuring the RIS system based on the beam-steering reflection matrix. Among the one or more RISs, each RIS is configured to redirect an incident electromagnetic (EM) signal toward an antenna array of an intended receiver. The incident EM signal is received from an antenna array at the transmitter. In a vertical plane, a location of the RIS above ground differs from a vertical location ($h_t$) of the transmitter by a height placement value ($h_{RIS}$). In a horizontal plane, the location of the RIS is a first distance ($D_{TX\text{-}RIS}$) from the transmitter and a second distance ($D_{RX\text{-}RIS}$) from the receiver.

In another embodiment, an apparatus for RIS-assisted LoS MIMO for range extension at THz is provided. The apparatus includes a reconfigurable intelligent surface (RIS) and an RIS controller operably connected to the RIS. The RIS is configured to redirect an incident electromagnetic (EM) signal toward an antenna array of an intended receiver. The incident EM signal is received from an antenna array at the transmitter. In a vertical plane, a location of the RIS above ground differs from a vertical location ($h_t$) of the transmitter by a height placement value ($h_{RIS}$). In a horizontal plane, the location of the RIS is a first distance ($D_{TX\text{-}RIS}$) from the transmitter and a second distance ($D_{RX\text{-}RIS}$) from the receiver. The RIS controller is configured to detect one or more wireless control signals from the transmitter. The RIS controller is configured to identify a channel state and one or more phases based on the one or more detected wireless control signals. The RIS controller is configured to improve a beam-steering reflection matrix (Φ) of the RIS based on a singular value decomposition of channel matrices. The RIS controller is configured to configure the RIS based on the beam-steering reflection matrix.

In yet another embodiment, a non-transitory computer readable medium comprising program code for RIS-assisted LoS MIMO for range extension at THz is provided. The computer program includes computer readable program code that when executed causes at least one processor to establish a connection to a reconfigurable intelligent surface (RIS) system that includes one or more RISs. The computer readable program code causes the processor to detect one or more wireless control signals from a transmitter. The computer readable program code causes the processor to identify a channel state and one or more phases based on the one or more detected wireless control signals. The computer readable program code causes the processor to improve a beam-steering reflection matrix (Φ) of the RIS system based on a singular value decomposition of channel matrices. The computer readable program code causes the processor to configure the RIS system based on the beam-steering reflection matrix. Among the one or more RISs, each RIS is configured to redirect an incident electromagnetic (EM) signal toward an antenna array of an intended receiver. The incident EM signal is received from an antenna array at the transmitter. In a vertical plane, a location of the RIS above ground differs from a vertical location ($h_t$) of the transmitter by a height placement value ($h_{RIS}$). In a horizontal plane, the location of the RIS is a first distance ($D_{TX\text{-}RIS}$) from the transmitter and a second distance ($D_{RX\text{-}RIS}$) from the receiver.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
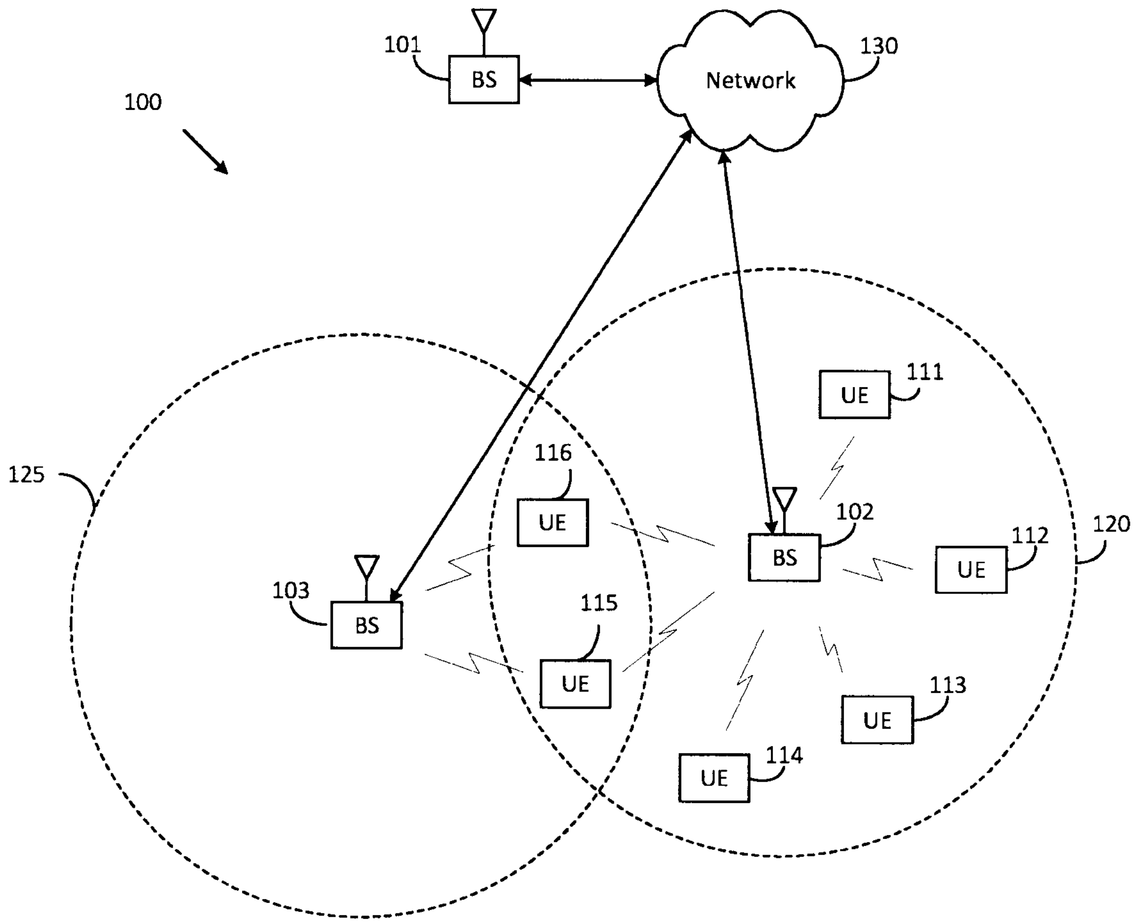
FIG. 1 illustrates an example wireless network according to this disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

As introduced above, establishing a reliable transmission link at such terahertz (THz) band frequencies, however, is non-trivial. Considering that the multi-path effect is no longer renounced, having a high-rank channel will depend on the array apertures. Spatial multiplexing becomes possible when the antenna spacing follows the Rayleigh spacing. At a short transmitter-to-receiver distance (e.g., antenna's near field), a line-of-sight (LoS) link between the transmitter and receiver becomes very sensitive to blockage effects, and the blockage effects can deteriorate the signal-to-noise ratio (SNR) of the system. Ultra-massive multiple-input multiple-output (MIMO) has been studied in the context of THz communications that may provide beamforming gains to overcome the mentioned limitations. However, the ultra-massive MIMO may result in massive power consumption and can introduce new challenges for the overall system. As a solution to these problems, this disclosure proves a reconfigurable intelligent surface (RIS) system that includes one or more RISs.

The RIS system, according to embodiments of this disclosure, can be utilized in various wireless communication scenarios various, for example: unmanned aerial vehicle communication, simultaneous wireless information and power transfer, cognitive radio systems etc. An RIS is composed of passive components and can redirect the incident electromagnetic signal to the desired direction. RISs are not limited to being used in scenarios where the signal is blocked due to obstacles. However according to embodiments of this disclosure, the RIS system uses RISs to extend the range of a LoS MIMO system at THz communication. Increasing the communication range using an RIS can reduce the number of nodes needed, such as reducing the use of active relays or several base stations in adjacent cells. The passive RIS architecture is efficient and low cost, especially if compared to the computational complexity and massive power consumption of the ultra-massive MIMO.

This disclosure integrates concepts from three technologies, including THz communications, LoS MIMO, and RIS surfaces. These three technologies are incorporated together for their potential implications on future backhaul networks for 6G communications. The fact that extending the range is a challenge at THz frequencies, the embodiments of this disclosure use of an RIS system to assist the LoS link and extend coverage. Further, the embodiments of this disclosure strategically specify (e.g., design) the placement of the RIS surface in the wireless channel. The RIS location, as specified by this disclosure, will preserve the near field property of the wave (i.e., the RIS is in the near field of both the TX and RX). In this disclosure, the distance of separation between the TX-RIS and RIS-RX and the number of antenna panels at the TX and RX side, are used to calculate the distance of separation between the antenna panels (each panel can have elements spaced by the inter-element spacing of one-half wavelength ($\lambda/2$, which is lambda/2).

By specifying and implementing such a setup, embodiments of this disclosure will assist the wireless channel in maintaining a full rank matrix and a stable wireless connection while providing high data rates. The RIS can manipulate the incident wave and reflect the impinging wave to an intended destination. Unlike active relays, the RIS system of this disclosure is made of passive components that do not require many radio frequency chains and power amplifiers. The use of the RIS at THz frequencies evidence some of the novelty in this disclosure.

One of the features provided by this disclosure includes the combination of RIS and Rayleigh spacing for the purpose of modifying utilizing RISs to extend a range between a TX base station and an RX base station while having orthogonal signals that preserve channel stability at a high frequency. Without proper modification of RIS, orthogonal signals will be less likely, and channel stability at a high frequency will be less likely to be preserved.

One of the other features provided by this disclosure includes antenna array design, including: calculating a distance ($d_{RIS}$) between antenna panels based on a distance between a TX-RIS base station and a RX-RIS base station and a number of antenna panels at a TX side and a RX side; and calculating each of $d_t$ and $d_r$ based on D and the total number of TX and RX antenna panels. These values are defined further below in Table 2. In contrast to an antenna array in which the vertical distance between two antenna panels of an RIS is $\lambda/2$, the embodiments of this disclosure calculate an optimal $d_{RIS}$ based on the Rayleigh spacing, and also calculates optimal values for $d_t$ at the TX and $d_r$ at the RX.

Another one of the features provided by this disclosure includes optimizing a beam-steering reflection matrix ($\Phi$) of the RIS system using a singular value decomposition (SVD) of channel matrices (H1, H2). That is, this disclosure provides methods for optimizing the $\Phi$ based on H1 and H2 SVDs.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO, array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

Figure 2:
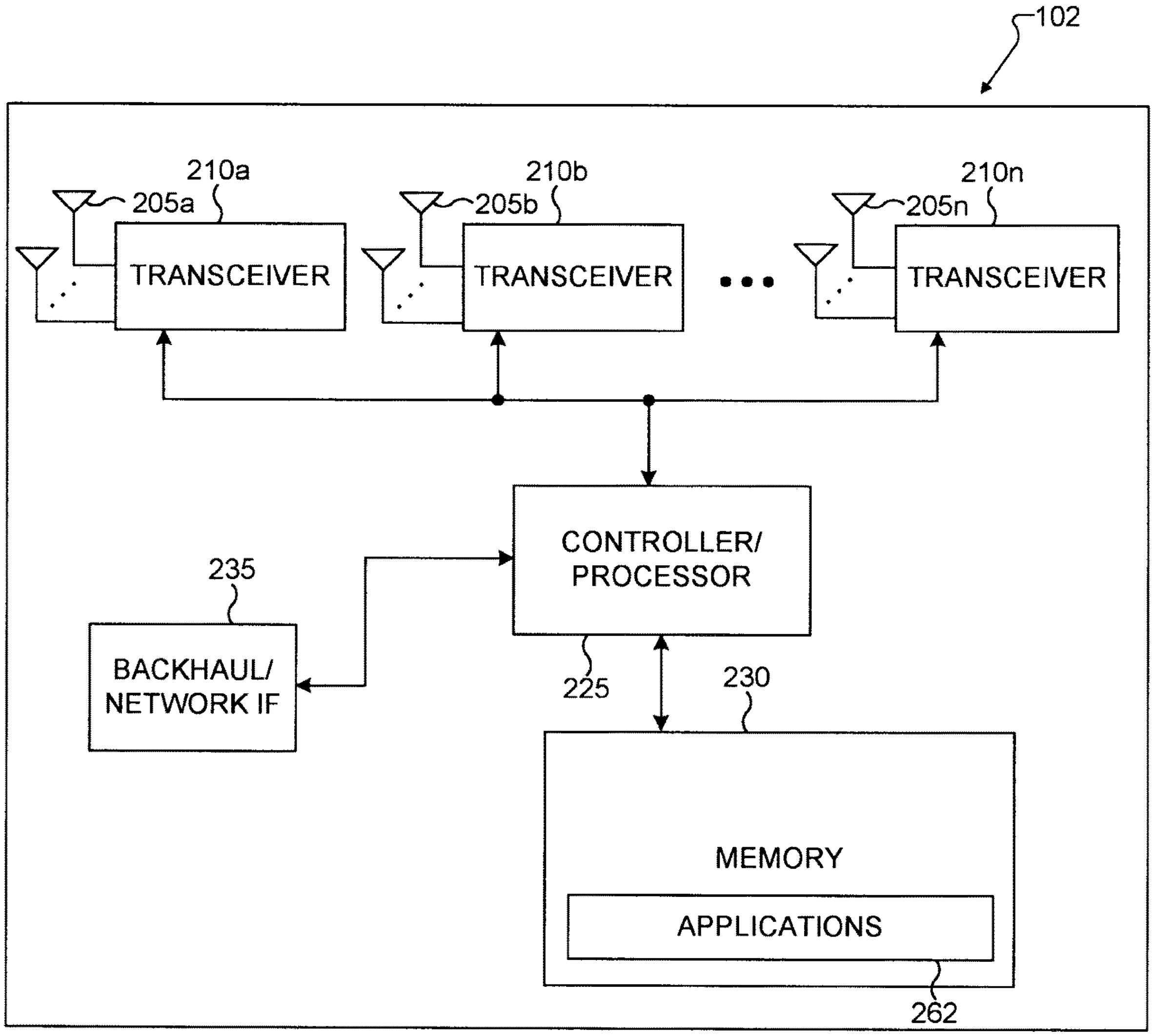
FIG. 2 illustrates an example gNodeB (gNB) according to this disclosure.
Figure 3:
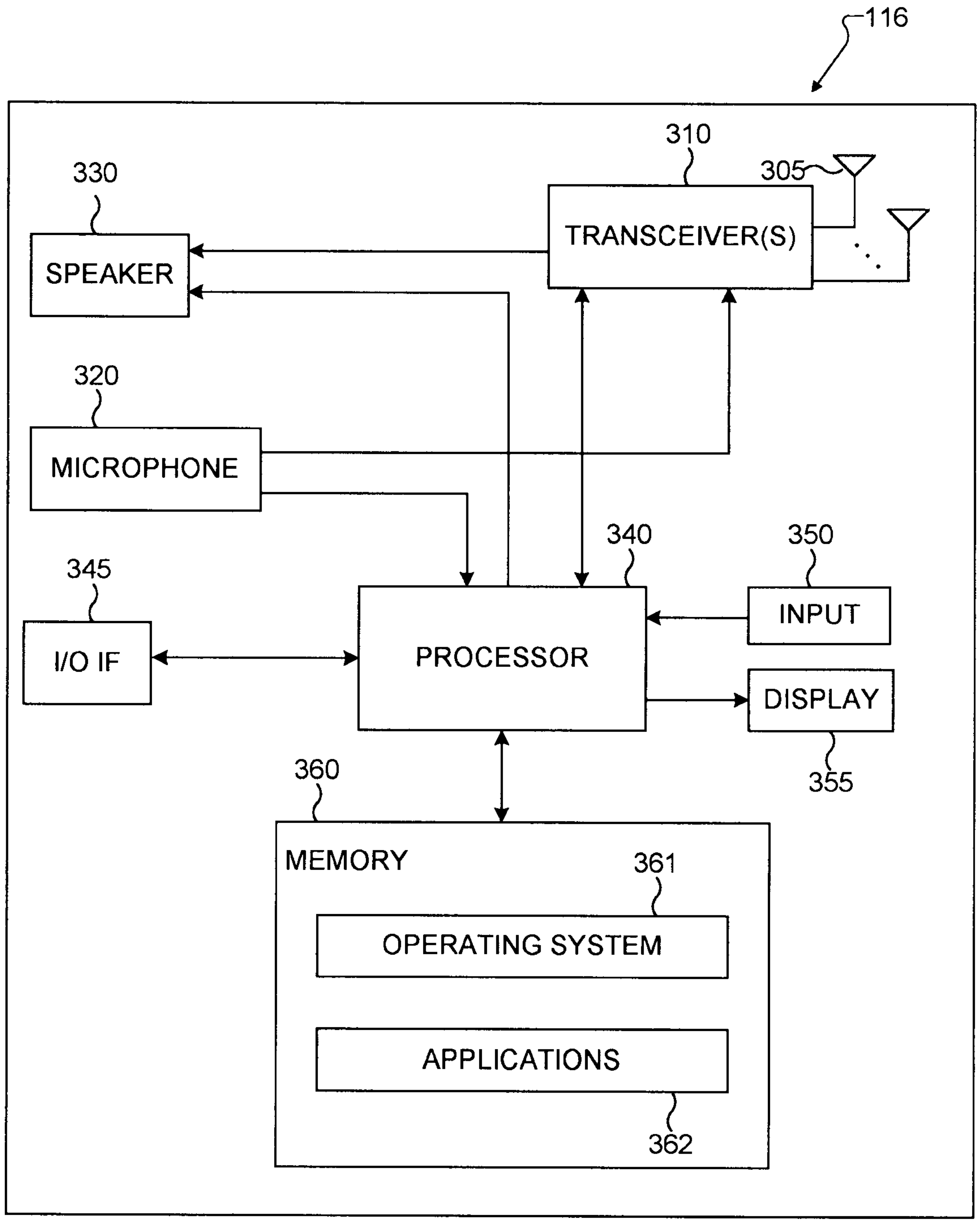
FIG. 3 illustrates an example user equipment (ULE) according to this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, the system of this disclosure is provided to extend the range of an LoS MIMO transmission at THz frequencies within a wireless channel by incorporating THz communications, LoS MIMO, and RIS surfaces technologies together in order to strategically design and place the RIS surfaces in the wireless channel and to maintain a full rank matrix for the wireless channel.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

As described in more detail below, the memory 230 includes one or more applications 262, which can be firmware. In some embodiments, the controller/processor 225 executes the applications 262 in response to signals received from other gNBs or other network devices, such as the RIS controller of FIGS. 6, 8, and 9 connected to the backhaul or network interface 235. The applications 262 enables the gNB 102 to execute a method of RIS-assisted LoS MIMO for range extension at THz, as shown in FIG. 10.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

As described in more detail below, each of the gNBs and UEs of this disclosure is provided to extend the range of an LoS MIMO transmission at THz frequencies within a wireless channel by incorporating THz communications, LoS MIMO, and RIS surfaces technologies together in order to strategically design and place the RIS surfaces in the wireless channel and to maintain a full rank matrix for the wireless channel.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
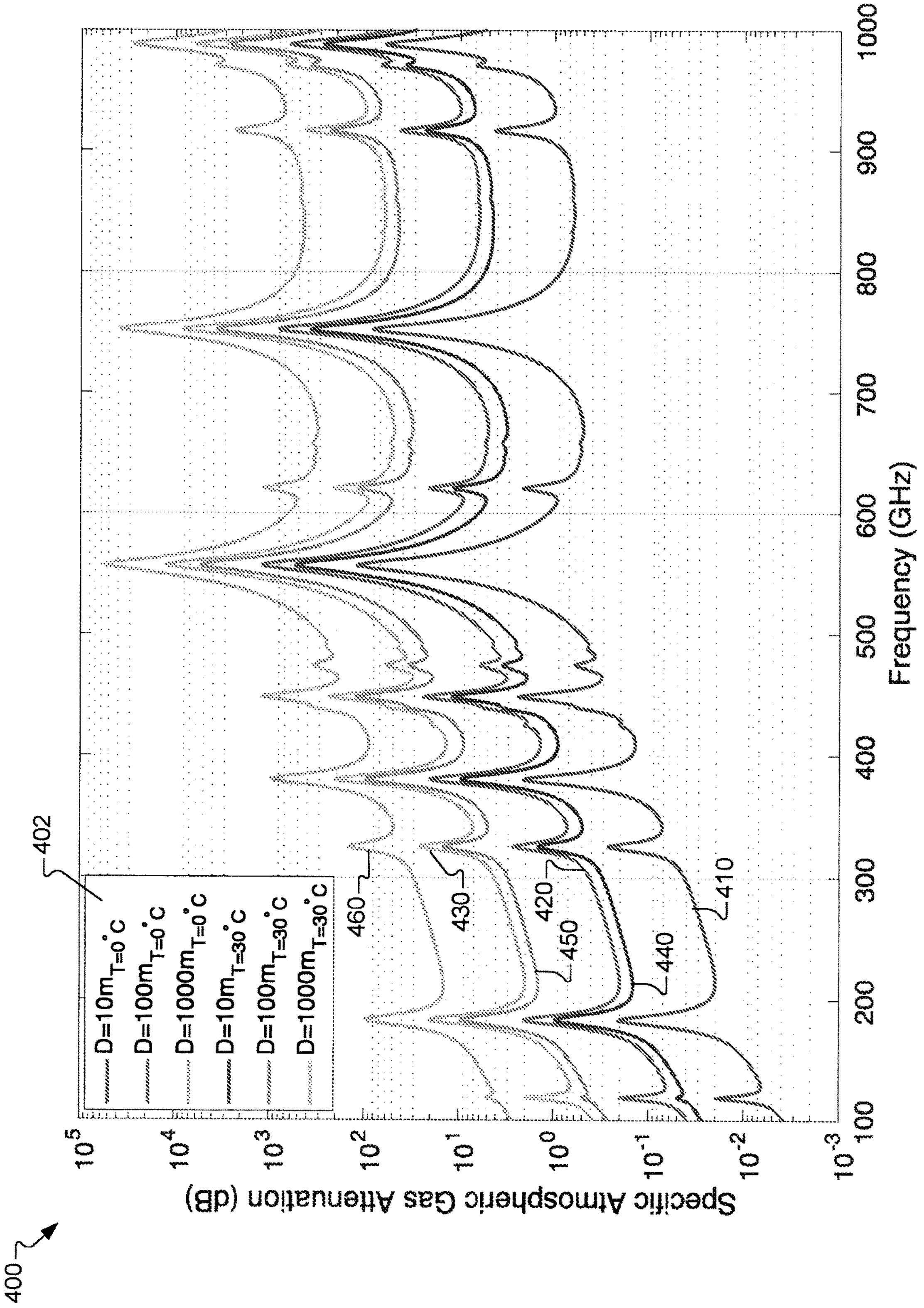
FIG. 4 illustrates a graph of various examples of a signal attenuation due to molecular absorption at different temperatures and different distances, in accordance with embodiments of this disclosure.

FIG. 4 illustrates a graph 400 of various examples of a signal attenuation due to molecular absorption (e.g., water vapor) at different temperatures and different distances, in accordance with embodiments of this disclosure. The x-axis represents the frequency (measured in GHz) of an electromagnetic (EM) signal transmitted from a transmitter via a wireless channel along a LoS path to a receiver. The y-axis represents specific atmospheric gas attenuation (measured in decibels (dB)) of the transmitted EM signal. The embodiments within the graph 400 shown in FIG. 4 are for illustration only, and other embodiments could be used without departing from the scope of this disclosure. Table 1 below includes a reference number for each example signal transmission listed in the legend 402, and Table 1 shows the different separation distances (D) from the transmitter to the receiver and the different temperatures (T) of the atmospheric gas (i.e., water vapor) in relation to the different example signal transmissions, respectively.

TABLE 1

Temperatures of atmospheric gas, Signal Transmissions, and Separation Distances

| Example Signal Transmission | Reference No. | D (in meters) | T (in Celsius) |
|---|---|---|---|
| 1 | 410 | 10 | 0 |
| 2 | 420 | 100 | 0 |
| 3 | 430 | 1000 | 0 |
| 4 | 440 | 10 | 30 |
| 5 | 450 | 100 | 30 |
| 6 | 460 | 1000 | 30 |

Embodiments of this disclosure provide solutions to real world problems, including the problems of: (1) propagation loss due to molecular absorption is a function of frequency and the communication distance (e.g. due to water vapor molecules) through air; (2) signal attenuation at high frequencies is greater than signal attenuation at low frequencies; and (3) hardware and implementation cost of having multiple base stations or ultra-massive MIMO range extension and coverage enhancement for outdoor scenarios. The above-described problems create a difficult challenge in wireless communication systems that seek to maintain reliable connectivity to accommodate high data rates in backhaul networks.

Embodiments of this disclosure provide a technical solution that extends the communication range at THz frequencies while maintaining a full rank channel in a LoS MIMO setup. Particularly, embodiments of this disclosure provide a system including modified/customized mirrors that enable real-time, passive, and inexpensive long-distance visual sight. The configuration/optimization of the system and the modification/customization of the mirrors provides technical advantages, as described further below.

Figure 5:
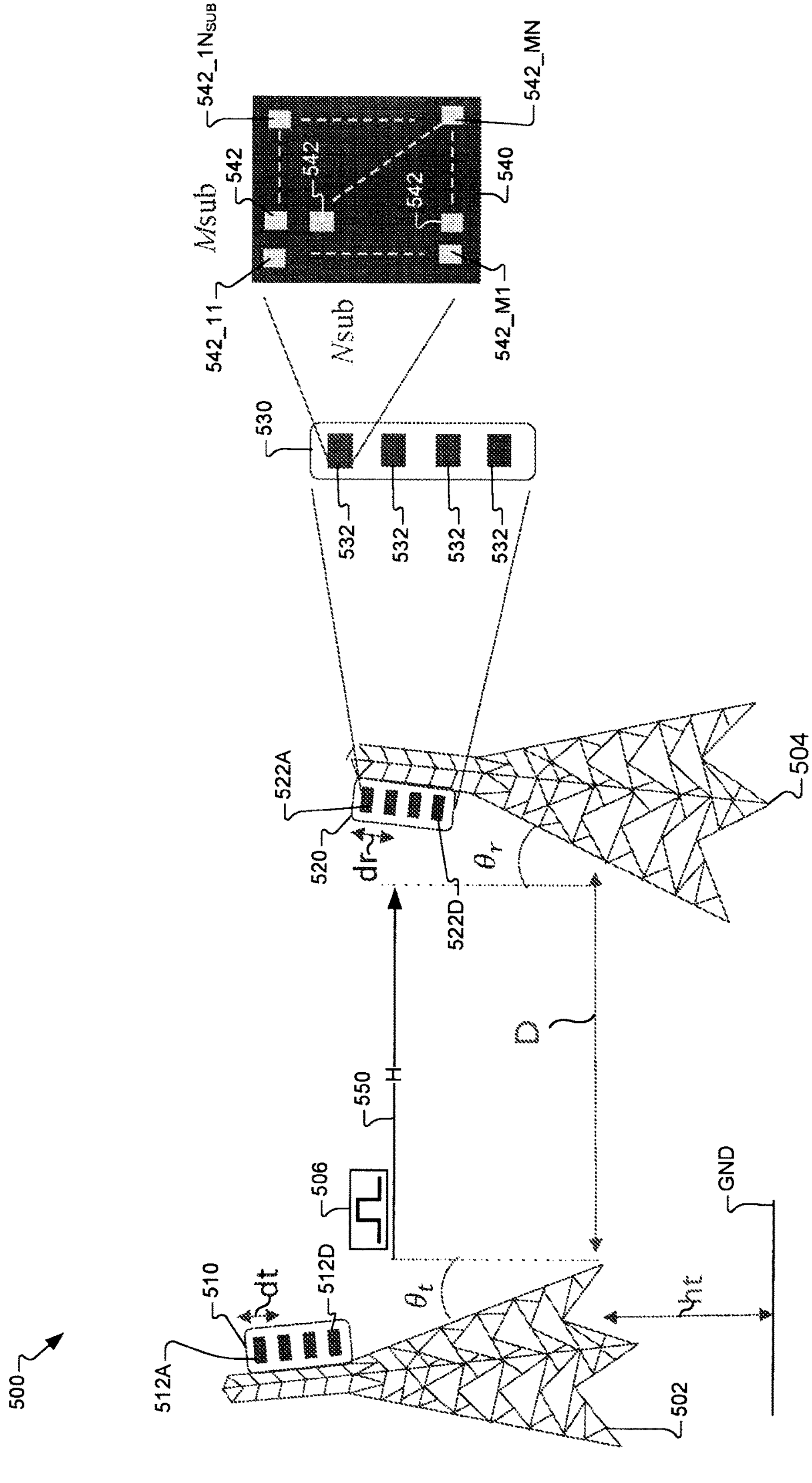
FIG. 5 illustrates a transmitting (TX) base station and a receiving (RX) base station arranged in the architecture of a 4×4 line-of-sight (LoS) multiple-input multiple-output (MIMO) system according to embodiments of this disclosure.

FIG. 5 illustrates a transmitting (TX) base station 502 and a receiving (RX) base station 504 arranged in the architecture of a 4×4 line of sight (LoS) MIMO system 500 according to embodiments of this disclosure. The LoS MIMO system 500 in this example includes 4 input streams and 4 output streams (i.e., 4×4 MIMO). The embodiment of the LoS MIMO system 500 shown in FIG. 5 is for illustration only, and other embodiments could be used without departing from the scope of this disclosure.

The location of the TX base station 502 is a distance $h_t$ above the ground surface GND, which is the vertical location of the TX base station 502 in a vertical dimension. The location of the TX base station 502 is a certain distance D apart from the location of the RX base station 504. In other words, an EM signal 506 transmitted by the TX base station 502 propagates a distance D through the outdoor air (composed of atmospheric gases such as water vapor) to the RX base station 504.

The transmitting base station 502 includes an antenna set 510 that includes multiple antennas (such as the multiple antennas multiple antennas 205*a*-205*n* of FIG. 2). The antenna set 510 includes 4 antenna panels 512*a*-512*d* that provide four (4) transmitting/output streams, respectively.

The receiving base station 504 includes an antenna set 520 that includes multiple antennas (such as the multiple antennas multiple antennas 205*a*-205*n* of FIG. 2). The antenna set 520 includes 4 antenna panels 522*a*-522*d* that provide four (4) receiving/input streams, respectively. The antenna sets 510 and 520 at the TX and RX base stations 502 and 504 are composed of a uniform linear arrays, such as the example uniform planar array 530. Particularly, within the antenna set 520 of the receiving base station 504, the antenna panels 522*a*-522*d* are arranged as a uniform linear array 530 and are separated by a separation distance $d_r$. Also, within the antenna set 510 of the transmitting base station 502, the antenna panels 512*a*-512*d* are arranged as the uniform linear array 530 and are separated by a separation distance $d_t$.

The example uniform linear array 530 has dimensions of M×N, which dimensions indicates M rows and N columns. In this example, the uniform linear array 530 is an arrangement of panels 532 in a single column with four rows (i.e., M×N=4×1). In some embodiments, the panel 532 represents an antenna panel, such as any of the TX and RX antenna panels 512*a*-512*d* and 522*a*-522*d*. In some embodiments, the panel 532 represents a reflector panel 672 of FIG. 6 described further below. Each panel 532 can be a subarray 540 that includes a number (S) of elements 542. For ease of explanation, the elements 542 shown in FIG. 5 are also referred to as the antenna elements 542 for the case of the panel 532 being an antenna panel 512 or 522. In other examples, the elements 542 represent the reflector elements 680 (FIG. 6) in the case of the panel 532 being a reflector panel 672. The panel 532 can be a subarray 540 that includes multiple elements 542 (i.e., S>1), or the panel 532 can be one element 542 (i.e., S=1).

In this embodiment, the subarray 540 is defined by $N_{sub}$ columns and $M_{sub}$ rows, namely as an $N_{sub}$×$M_{sub}$ uniform planer array. In other embodiments of the subarray 540, the elements 542 could be arranged differently. Each antenna element 542 can have a row index (lower case m) and a column index (lower case n). For example, within the subarray 540, row 1 and column 1 of the subarray 540 is the location of a first antenna element 542_11; row 1 and column N is the location of a second antenna element 542_1N; row M and column 1 is the location of a third antenna element 542 M1; and row M and column N is the location of a fourth antenna element 542 MN.

The distance D is defined by the distance from the antenna panels 512*a*-512*d* of the TX base station 502 to the antenna panels 522*a*-522*d* of the RX base station 504, accordingly, the signal 506 transmitted by the TX antenna set 510 to the RX antenna set 520 traverses the distance D through a propagation channel, such as the channel 550. In this disclosure, the channel 550 is also referred as the propagation channel 550, LoS MIMO channel 550, and wireless control channel 550. The channel 550 is located between and defined by two ends, including a transmitter end and a receiver end. The transmitting base station 502 is the transmitter end. The receiving base station 504 is the receiver end. The channel 550 can be represented by a channel matrix H, as shown in FIG. 5. The wireless channel 550 can be represented mathematically by a channel matrix H, as defined in Equation 1 and as shown in FIG. 5.

$$H = \begin{bmatrix} h_{11} & \cdots & h_{1N} \\ \vdots & \ddots & \vdots \\ h_{M1} & \cdots & h_{MN} \end{bmatrix} \quad (1)$$

In wireless backhaul networks, the propagation channel 550 is primarily LoS due to the high carrier frequency and the narrow antenna beams. Hence, when the carrier frequency of the signal 506 is at THz frequencies, the LoS MIMO system 500 operates in the antenna's near field while satisfying a distance constraint. With limited scattering in the propagation environment, the LoS MIMO channel response can have highly correlated signals which results in a rank deficient channel matrix.

Embodiments of this disclosure provide solutions to the problem that is the rank deficient channel matrix. By optimizing the antenna placements, the data rates and the rank of the LoS MIMO channel 550 can be improved. The applications 262 provided according to embodiments of this disclosure optimize the antenna placements. The spacing of the antenna panels at the TX and RX follows the Rayleigh spacing, also referred to as the antenna separation product $d_t d_r$. This antenna separation product can be expressed by the Raleigh spacing equation, as shown in Equation 2. The antenna separation product depends on the distance D between the transmitter end and receiver end of the channel 550 (i.e., TX and RX base stations 502 and 504), and depends on the frequency of operation, fc. Further, the antenna separation product depends on the number of antennas at each side, generally. More specifically, the number of antennas at each side refers to the number of antenna panels at each dimension of the antenna set (e.g., 510 or 520), where the column dimension has N antenna panels, and the row dimension has M antenna panels. As shown, V denotes the number of antenna panels at whichever dimension has fewer antenna panels (i.e., V=min(N,M)). Among the TX and RX antenna sets 510 and 520, each antenna set includes M=S as the number of antenna panels at the row side and N=1 antenna panel at the column side. For minimum separation, K=1, and tilt angles $\theta_t$ and $\theta_r$ at the TX and RX antenna sets 510 and 520, respectively.

$$d_t d_r = \frac{\lambda D_{TX-RX}}{V \cos\theta_t \cos\theta_r} K \quad (2)$$

To obtain the antenna separation product formula, the applications 262 derive the channel orthogonality formula. The orthogonality between the channel columns is obtained when the inner product from two transmitted signals is expressed according to Equation 3, where r is not equal to s (i.e., r≠s), and where r,s=1 . . . N, and the column dimension has N antenna panels.

$$\langle h_r, h_s \rangle = 0 \quad (3)$$

Figure 6:
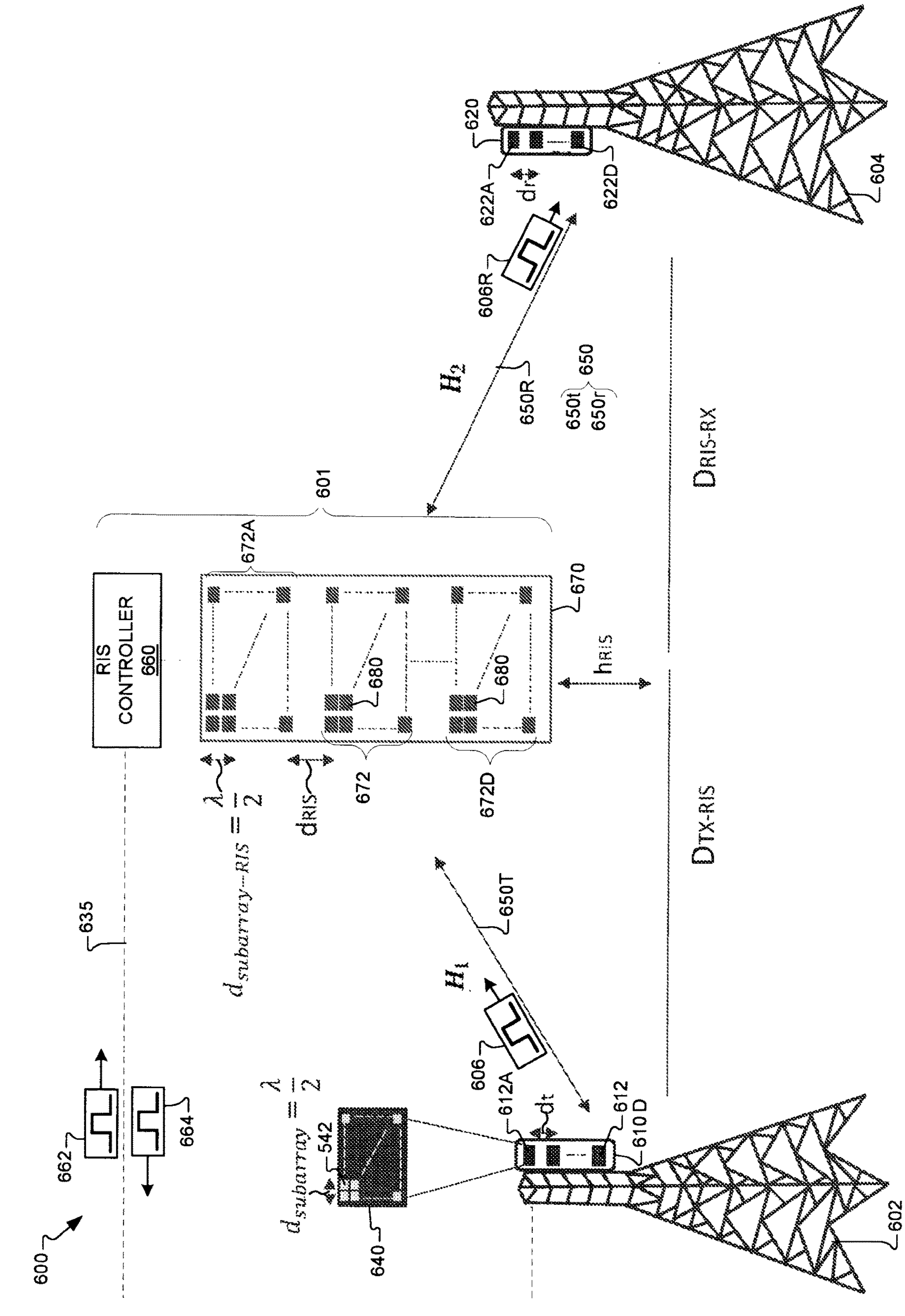
FIG. 6 illustrates a reconfigurable intelligent surfaces assisted (RIS-assisted) LoS MIMO system for range extension at terahertz (THz) frequencies according to embodiments of this disclosure.

FIG. 6 illustrates an RIS-assisted LoS MIMO system 600 for range extension at THz frequencies according to embodiments of this disclosure. The embodiment of the system 600 shown in FIG. 6 is for illustration only, and other embodiments could be used without departing from the scope of this disclosure.

The RIS-assisted LoS MIMO system 600 includes an RIS system 601 that extends a range between TX gNB 602 and RX gNB 604. The RIS system 601 reflects signals that were transmitted at THz frequencies, and the RIS system 601 can extend the range of backhaul network communications (e.g., wireless control signals transmitted from one gNB to another gNB) in the RIS-assisted LoS MIMO system 600. The RIS system 601 is configured to redirect an incident electromagnetic (EM) signal 606 toward an antenna array of an intended receiver. The signal 606 is transmitted by the TX antenna set 610 and is intended to be received at the RX antenna set 620. More particularly, while intending to that the signal 606 will be received by the RX gNB 604, the TX gNB 602 transmits the signal 606 by utilizing LoS MIMO at a wavelength (λ) within THz frequencies and at a direction toward the RIS system 601. In certain embodiments, the signal 606 is a control signal. The signal 606 traverses a certain distance $D_{TX-RIS}+D_{RIS-RX}$ through a multi-segment propagation channel 650. The multi-segment propagation channel 650 includes an initial channel 650*t* and an ultimate channel 650*r*, which are also referred to as channel segments. The TX gNB 602 and the RIS system 601 are the transmitter and receiver ends of initial channel 650*t*, respectively. The RIS system 601 and the RX gNB 604 are the transmitter and receiver ends of ultimate channel 650*r*, respectively. The initial channel 650*t* can be represented mathematically by a channel matrix $H_1$, and the ultimate channel 650*r* can be represented mathematically by a channel matrix $H_2$.

The Tx gNB 602, Rx gNB 604, TX antenna set 610, TX antenna panels 612*a*-612*d*, RX antenna set 620, RX antenna panels 622*a*-622*d*, subarray 640, and antenna elements 642 are the same as or similar to the corresponding components 502, 504, 510, 512*a*-512*d*, 520, 522*a*-522*d*, 540, and 542 of FIG. 5. For example, both of the location of the TX gNB 602 and the location of the RX gNB 604 are the distance $h_t$ above the ground surface. The backhaul or network interface 635 can be the same as or similar to the network interface 235 of FIG. 2, and carries control signals between the TX gNB 602 and the RIS system 601.

The RIS system 601 includes an RIS controller 660 and a single RIS 670. The RIS controller 660 detects a control link signal 662 output from a transmitter, such as the TX gNB 602. The control link signal 662 can indicate the transmit configuration of the signal 606 that the TX gNB 602 intends for the RX gNB to receive. In response to detecting the control link signal 662, the RIS controller 660 generates and sends a feedback control signal 664 to the TX gNB 602 to cause the TX gNB 602 to transmit the signal 606 in a direction toward the RIS 670 instead of a direction toward the RX gNB 604.

The RIS controller 660 can include one or more processors or other processing devices that control the overall operation of one or more RIS 670 within the RIS system 601. For example, the RIS controller 660 could support tuning the RIS 670 to reflect an impinging wave (i.e., signal 606) at a predetermined phase and to steer the impinging wave to a predetermined angle. In some embodiments, the RIS controller 660 includes an FPGA. In some embodiments, the RIS controller 660 includes at least one microprocessor or microcontroller.

The RIS system 601 is designed such that each of the TX antenna set 610, RX antenna set 620, and RIS 670 is an N×M uniform linear array 530 composed of a number (W) panels 532. Each panel 532 includes a number (S) of elements spaced apart from each other by an inter-element spacing distance of one-half wavelength (λ/2). More particularly, each panel 532 within the RIS 670 is a reflector panel 672, and this example, the RIS 670 includes a single column with four rows of reflector panels 672 apart by a separation distance $d_{RIS}$ (i.e., $d_t=d_r=d_{RIS}$). In the embodiment shown in FIG. 5, all of the W reflector panels 672 within are identical to each other. Among the W reflector panels, a first reflector panel 672 includes a subset of the plurality of passive reflectors 680 arranged as a uniform planer subarray having $N_{sub}$ columns and $M_{sub}$ rows. In a particular non-limiting scenario, $N_{sub}=M_{sub}=10$; each panel includes 100 elements; the RIS 670 includes 4 panels, which means that the RIS 670 includes 400 elements (i.e., 100 elements/panel×4 panels/RIS). At the first reflector panel 672, within each of the columns of the uniform planer subarray, adjacent passive reflectors 680 are separated from each other by a columnar separation distance ($d_{subarray\text{-}RIS}$). In certain embodiments of the first reflector panel 672, within each of the rows of the uniform planer subarray, adjacent passive reflectors 680 are separated from each other by a row-wise separation distance that is the same as the row-wise separation distance between the antenna elements 542 ($d_{subarray}$). The columnar separation distance ($d_{subarray\text{-}RIS}$) between the passive reflectors 680 of the RIS 670 and the row-wise separation distance between the antenna elements 542 ($d_{subarray}$) of the antenna sets 510 and 520 are equal to one-half wavelength $$\left(\text{i.e., } \frac{\lambda}{2} = d_{subarray\text{-}RIS} = d_{subarray}\right).$$

Each passive reflector 680 is a passive component that does not have an RF chain connected to it.

The distance $D_{TX\text{-}RIS}$ is defined by the distance from the antenna panels 612*a*-612*d* of the TX gNB 602 to the reflector panels 672*a*-672*d* of the RIS 670. Accordingly, the signal 606, which is transmitted by the TX antenna set 510 to the RIS 670, traverses the distance $D_{TX\text{-}RIS}$ through the initial segment 650*t* of the propagation channel 650. Analogously, the distance $D_{RIS\text{-}RX}$ is defined by the distance from the reflector panels 672*a*-672*d* of the RIS 670 to the antenna panels 622*a*-622*d* of the RX gNB 604, accordingly, the signal 606 reflected by the RIS 670 toward the RX gNB 604 (i.e., the intended receiver of the signal 606) traverses the distance $D_{RIS\text{-}RX}$ through the ultimate segment 650*r* of the propagation channel 650. The antenna gains at the TX and RX are Gt and Gr. To maintain a stable link connection, the distance between the TX and RX is carefully determined and the spacing of the panels is derived accordingly.

In some scenarios, if there are size restrictions on the antenna panels at the base stations, a determination can be made about whether to increase the range and coverage in a certain area. In some scenarios, if the antennas at the base stations are already fabricated and mounted for a specific distance D, the RIS-assisted LoS MIMO systems of this disclosure enable increasing the range with the low cost and as few changes as possible. The RIS is located at a distance D from the TX and RX gNBs, thereby increasing (e.g., doubling) the distance between the TX and RX to 2×D. The RIS 670 can be positioned differently, but if an assumption is that the antennas are fabricated and mounted, it is consistent to use a similar topology for the RIS location. In certain embodiments that include more than on RIS stacked to extend the range further, additional optimization is executed for each RIS to determine the best beam-steering reflection matrix. This disclosure provides a trade-off between the range, path-loss, and optimization on the processing matrix of the RISs.

The location of the TX gNB 602 is a distance $D_{TX\text{-}RIS}$+$D_{RIS\text{-}RX}$ apart from the location of the RX base station 604. In a vertical plane, a location of the RIS 670 above ground differs from a vertical location ($h_t$) of the transmitter (i.e., TX gNB 602) by a height placement value ($h_{RIS}$). In other words, the $h_{RIS}$ is the difference between the transmitter's height ($h_t$) above ground and the RIS's 670 height above ground. It is understood that the RIS's 670 vertical location or height above ground is distinct from the vertical dimension of the RIS 670. The $h_{RIS}$ can be a preset value (for example, 0 m, 5 m, 10 m) and/or can be a situation-based value on building restrictions and/or law restrictions.

As introduced above, the RIS 670 assists the LoS MIMO transmission at THz frequencies. This disclosure to does not limit the RIS 670 to being used to redirect and beamform the EM signal 606 to the intended destination when the channel imposes blockage or attenuation onto the signal, but rather, embodiments of this disclosure use the RIS 670 to for extending the range between the TX and RX gNBs 602 and 604 while having orthogonal signals that preserve the stability of the channel 650 at high frequencies. Because the signal 606 is transmitted at high frequencies, and especially at THz frequencies, the LoS component of the signal 606 is dominant. Hence multiplexing gains result from an optimized design of the antenna array at the TX and RX antenna sets 510 and 520. The attenuation at these THz frequencies encourages short range communication, and hence the antenna sets 510 and 520 at TX and RX gNBs 602 and 604 will be in the near field region to relative to each other.

Optimization

In addition to the physical architecture of the RIS-assisted LoS MIMO system 600, the RIS controller 660 enables operational/functional features of this disclosure. The RIS controller 660 determines an optimized reflection matrix (Φ) of the RIS 670 using a singular value decomposition (SVD) of the multiple channel matrices $H_1$ and $H_2$, which correspond to the multiple propagation channel segments 650*t* and 650*r*.

Because the antenna systems of the TX and RX gNBs 602 and 604 operate at the THz frequencies, the RIS controller 660 defines the medium absorption coefficient ($k_{abs}$) as defined in Equation 4, where and f denotes the frequency offset, and $Q^i$ denotes the number of molecules per volume unit. The absorption cross-section of gas i is denoted as $\sigma^i$. The system pressure is denoted as p (in Kelvin). The reference pressure is denoted as $p_0$ (for example, 1 atm). The temperature at standard pressure is denoted as $T_{STP}$. Hence, the medium absorption coefficient ($k_{abs}$) is also the weighted sum of the molecular absorption coefficients in the medium.

$$k_{abs}(f) = \sum_i \frac{p}{p_0} \frac{T_{STP}}{T} Q^i \sigma^i \tag{4}$$

The values of $k_{abs}(f)$ can be calculated using predefined standard atmosphere conditions. As a result, the channel matrix H (as a function of the frequency offset f) can be expressed according to Equation 5, where the variables are defined according to Table 2. The antenna gain G is a given design parameter of the antenna. The operation frequency $f_c$ is a given value, for example, 140 GHz. The wavelength of the signal 606 can be equivalent to half of the speed of light (c/2), which is a given value. The absorption level $k_{abs}$ can be a given or measured value, and for example, may indicate how does rain or weather affect the signal (e.g., attenuation or propagation of the signal).

$$H(f)=\frac{\lambda D}{4\pi}\sqrt{G_tG_r}\begin{bmatrix}\frac{\exp\left(\frac{-j2\pi(f+f_c)d_{11}}{c}\right)}{d_{11}\exp\left(\frac{-k_{abs}(f)d_{11}}{2}\right)} & \cdots & \frac{\exp\left(\frac{-j2\pi(f+f_c)d_{1N}}{c}\right)}{d_{1N}\exp\left(\frac{-k_{abs}(f)d_{1N}}{2}\right)}\\ \vdots & \ddots & \vdots \\ \frac{\exp\left(\frac{-j2\pi(f+f_c)d_{M1}}{c}\right)}{d_{M1}\exp\left(\frac{-k_{abs}(f)d_{M1}}{2}\right)} & \cdots & \frac{\exp\left(\frac{-j2\pi(f+f_c)d_{MN}}{c}\right)}{d_{MN}\exp\left(\frac{-k_{abs}(f)d_{MN}}{2}\right)}\end{bmatrix} \quad (5)$$

TABLE 2

Definition of variables

| Variable | Definition |
|---|---|
| H | singular value decomposition of channel matrix |
| $f_c$ | central frequency is also referred to as operation frequency |
| λ | wavelength |
| f | frequency offset |
| D | distance between TX gNB and RX gNB is a measured value |
| $D_{TX\text{-}RIS}$ | the distance between the TX gNB and RIS |
| $D_{RIS\text{-}RX}$ | distance between the RIS and RX gNB |
| $d_{11}$ | distance between first antenna element at the RX and first antenna element at the TX |
| $G_r$ | gain at RX antenna |
| $G_t$ | gain at TX antenna |
| $k_{abs}$ | absorption level |
| $h_{RIS}$ | height placement of RIS |
| $d_{RIS}$ | separation distance between reflector panels at the RIS |
| $d_t$ | separation distance between antenna panels at the TX gNB |
| $d_r$ | separation distance between antenna panels at the RX gNB |
| $d_{subarray\text{-}RIS}$ | inter-element spacing at the reflector panel of the RIS is equal to λ\2 |
| $d_{subarray}$ | inter-element spacing at the antenna panel of the TX and RX gNBs is equal to λ/2 |

The optimization performed by the RIS controller 660 includes determining (i.e., solving form) the steering/processing matrix (Φ) that maximizes the channel spectral efficiency and provides a stable communication link and a good SNR level. The signal 606 that the TX gNB 602 transmitted to the RIS 670 is denoted as x, and is expressed according to Equation 6. The received signal 606*r* that the RIS 670 redirected (e.g., reflected) toward the antenna set 620 of the RX gNB 604 (e.g., intended receiver) is denoted as y, and is expressed according to Equation 7. In Equations 6 and 7, $C^{M\times N}$ denotes a set of complex numbers (i.e., real and imaginary numbers) with dimensions of M×N. In the particular scenario shown, M=N and as an example, N=4.

$$x\in C^{N\times 1} \quad (6)$$

$$y\in C^{M\times 1} \quad (7)$$

More particularly, the received signal with the RIS component can be expressed according to Equation 8, where $y_{RIS\text{-}LoS}$ denotes the signal received from the RIS 670 at the RX gNB 604, x denotes a signal transmitted to the RIS 670 from the TX gNB 602, and n denotes noise.

$$y_{RIS\text{-}LoS}=H_2\Phi H_1x+n. \quad (8)$$

The reflection matrix (Φ) is expressed according to Equation 9, where $C^{M\times N}$ denotes a set of complex numbers (i.e., real and imaginary numbers) with dimensions of M×N. In the particular scenario shown, the reflection matrix is a square matrix such that $M=N_{RIS}$ and $N=N_{RIS}$. The reflection matrix is also referred to as a steering matrix, beam-steering matrix, or processing matrix.

$$\Phi\in C^{N_{RIS}\times N_{RIS}} \quad (9)$$

The value of n can be a simulated value of noise, for example Gaussian distribution or Additive White Gaussian Noise (AWGN). The noise n can be expressed according to Equation 10, where $C^{M\times N}$ denotes a set of complex numbers (i.e., real and imaginary numbers) with dimensions of M×N. In the particular scenario shown, N=4.

$$n\in C^{M\times 1} \quad (10)$$

The RIS controller 660 determines the SVD of the channel matrices $H_1$ and $H_2$, which correspond to the multiple propagation channel segments 650*t* and 650*r*. Particularly, as expressed in Equations 11 and 12, the RIS controller 660 determines the SVD of the channel matrix $H_1$ that corresponds to the initial channel 650*t* between the TX gNB 602 and RIS 670. In Equations 11 and 12, U denotes a column vector used for formatting matrix; V column vector used for formatting matrix; and Σ denotes a diagonal matrix indicating the state of the channel. The state of the channel can indicate how the channel appears and/or signal strength. In certain embodiments, the column vectors U and V are not used. To express the initial channel matrix $H_1$ in Equation 12, $C^{M\times N}$ denotes a set of complex numbers (i.e., real and imaginary numbers) with dimensions of M×N, and in the particular scenario shown, the $M=N_{RIS}$.

$$H_1=U_1\Sigma_1V_1^H \quad (11)$$

$$H_1\in C^{N_{RIS}\times N} \quad (12)$$

Further, as expressed in Equations 13 and 14, the RIS controller 660 determines the SVD of the channel matrix $H_2$ that corresponds to the ultimate channel segment 650*r* between the RIS 670 and RX gNB 604. To express the ultimate channel matrix $H_2$ in Equation 14, $C^{M\times N}$ denotes a set of complex numbers (i.e., real and imaginary numbers) with dimensions of M×N, and in the particular scenario shown, the $N=N_{RIS}$.

$$H_2=U_2\Sigma_2V_2^H \quad (13)$$

$$H_2\in C^{M\times N_{RIS}} \quad (14)$$

This distance D between the TX and RX gNBs 602 and 604 of FIG. 6 is also equal to the distance D between the TX and RX from FIG. 5. Hence, $D_{TX\text{-}RIS}+D_{RIS\text{-}RX}=2\lambda D$. In a non-limiting particular scenario, the operation frequency $f_c$=140 GHz, so the $d_{subarray\text{-}RIS}$=0.001 m. Also in this particular scenario, frequency offset f is a given value, for example: f=2 in a narrowband case with $f_c$=138 GHz. The channel matrix including the steering matrix is expressed according to Equation 15.

$$H_2\Phi H_1=U_2\Sigma_2V_2^H\Phi U_1\Sigma_1V_1^H. \quad (15)$$

The RIS controller 660 can determine the reflection matrix (Φ) as expressed according to Equation 16.

$$\Phi=\mathrm{diag}\{e^{j\phi_1},\ \ldots\ ,e^{j\phi_{N_{RIS}}}\} \quad (16)$$

Embodiments of this disclosure provide a technical solution, namely, to optimize the reflection matrix (by using SVDs of the multiple channel matrices $H_1$ and $H_2$, which correspond to the set of multiple propagation channel segments {650*t* and 650*r*} that compose the propagation channel 650. The optimization can be expressed according to Equation 17. The optimization can be executed by the RIS controller 660 or as part of the applications 262 of FIG. 2. The optimization starts with the diagonal matrix being the identity matrix. Because the values are in the exponential format, then the value of the diagonal matrix is bounded to be less than or equal to 1 as an upper bound and bounded to be −1 as a lower bound.

$$\min \left\| V_2 U_1^H - \mathrm{diag}(\Phi) \right\|_2 \tag{17}$$

Although FIG. 6 illustrates one example of an RIS-assisted LoS MIMO system 600, various changes may be made to FIG. 6. For example, various components in FIG. 6 could be combined, further subdivided, or omitted and additional components could be added according to particular needs. As a particular example, the distance between the TX gNB 602 and the RX gNB 604 can be further increased by an RIS system 800 that includes a plurality of RISs 870_1 to 870_RISN as shown in the RIS-assisted LoS MIMO system 800 of FIG. 8. As another particular example, the RIS 670 is not limited to having a uniform linear array arrangement, and could have different arrangements, such as a uniform rectangular array shown in FIG. 9, a circular array, or other suitable two-dimensional arrangement.

Figure 7:
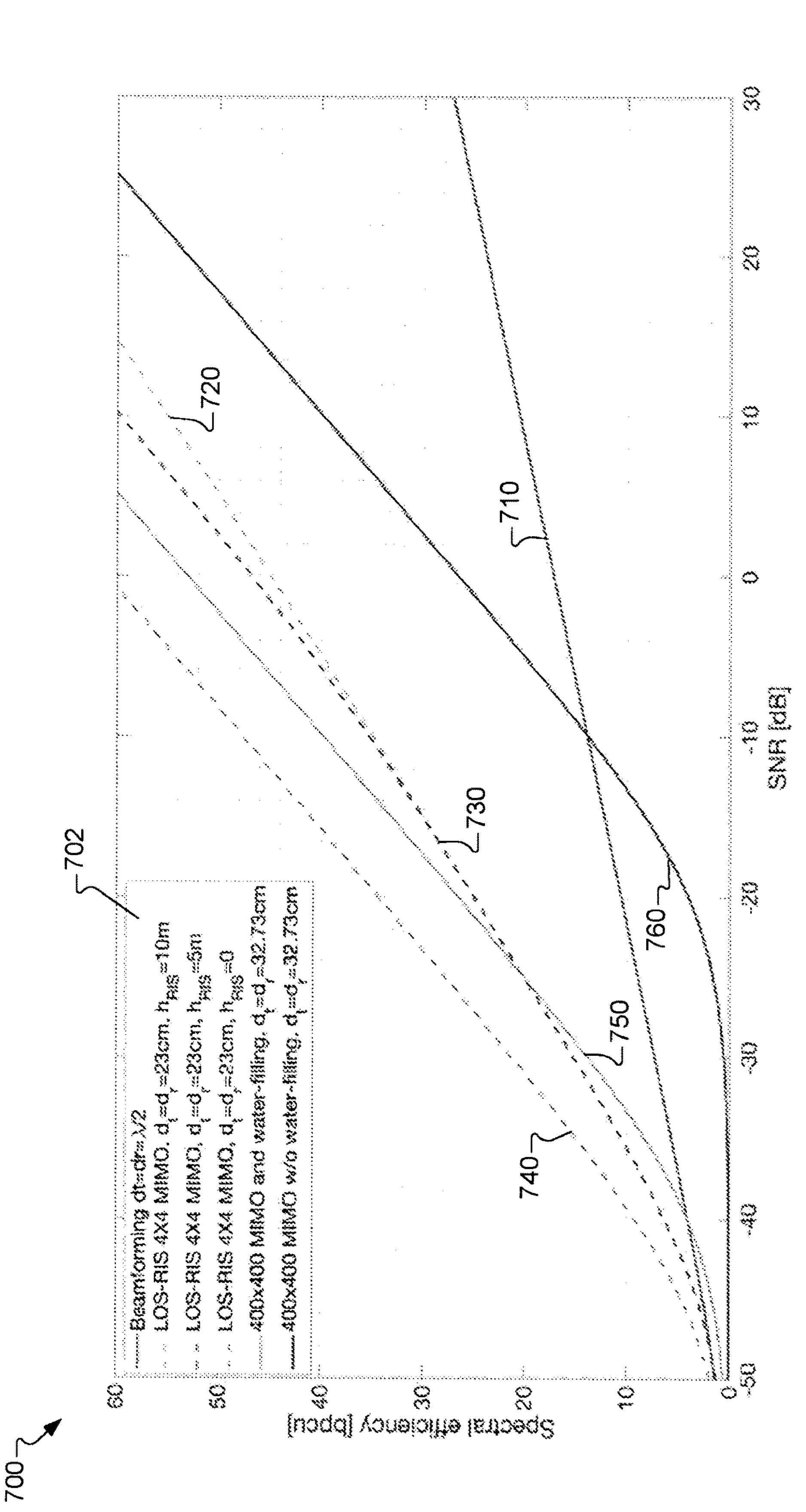
FIG. 7 illustrates a graph of various examples of spectral efficiency behavior of the RIS-assisted LoS MIMO system of FIG. 6 relative to signal-to-noise ratio (SNR), in accordance with embodiments of this disclosure.

FIG. 7 illustrates a graph 700 of various examples of spectral efficiency behavior of the RIS-assisted LoS MIMO system 600 of FIG. 6 relative to signal-to-noise ratio (SNR), in accordance with embodiments of this disclosure. The x-axis represents the SNR (measured in dB) of an EM signal (e.g., signal 606 of FIG. 6) transmitted from a transmitter via a wireless channel (e.g., initial channel 650*t* of FIG. 6) along an RIS-assisted LoS path to a receiver (e.g., RX gNB 604 of FIG. 6). The y-axis represents spectral efficiency (measured in bits per channel use (bpcu)) of the transmitted EM signal. The embodiments of the spectral efficiency shown in the graph 700 of FIG. 7 are for illustration only, and other embodiments could be used without departing from the scope of this disclosure.

The examples in the graph 700 demonstrate the importance of using an RIS 670 with the LoS MIMO. Table 3 below includes a reference number for each example signal transmission listed in the legend 702, and Table 3 shows the different system architectures, height placements ($h_{RIS}$), and panel separation distances ($d_{RIS}$).

TABLE 3

System Architectures, Height placement values, and Panel Separation Distances

| Reference No. | System Architecture | $h_{RIS}$ (in meters) | $d_{RIS} = d_t = d_r$ (in centimeters) |
|---|---|---|---|
| 710 | Beamforming | N/A | λ/2 |
| 720 | RIS-assisted LoS 4 × 4 MIMO | 10 | 23.15 |
| 730 | RIS-assisted LoS 4 × 4 MIMO | 5 | 23.15 |
| 740 | RIS-assisted LoS 4 × 4 MIMO | 0 | 23.15 |
| 750 | 400 × 400 MIMO and water-filling | N/A | 32.73 |
| 760 | 400 × 400 MIMO and water-filling | N/A | 32.73 |

In the various examples of spectral efficiencies 710-760 shown in the graph 700, the tilt angle $\theta_t$ at the TX antenna set 610 and tilt angle $\theta_r$ at the RX antenna set 520 are equal to zero (0). The example performance or behavior of the spectral efficiency 710 is of a single-input single-output (SISO) system (illustrated as "beamforming") with one-half wavelength (λ/2) spacing that has one RF chain. The SISO spectral efficiency 710 is compared to both the other spectral efficiencies 720-740 of the RIS-assisted LoS MIMO system 600 and the other spectral efficiencies 750 and 760 of a 400×400 LoS MIMO system with and without water-filling, respectively.

Particularly, in the examples of spectral efficiencies 720, 730, and 740 of the RIS-assisted LoS MIMO with respect to SNR shown in the graph 700: the RIS is at a height $h_{RIS}$, and the RIS's 670 separation distance from the TX gNB is $D_{TX\text{-}RIS}$ (for example, $D_{TX\text{-}RIS}$=100 m) while the distance of separation from the RIS to the RX gNB is $D_{RIS\text{-}RX}$ (for example, $D_{RIS\text{-}RX}$=100 m). The $h_r$=0, and as a results, the $d_t$=$d_r$=$d_{RIS}$=23.15 cm. Plotted within the graph 700 are the performances/behavior (e.g., 720, 730, and 740) of the RIS-assisted LoS MIMO system 600 at varying $h_{RIS}$ heights from the ground level ($h_{RIS}$=0 m, 5 m, 10 m).

The performances (e.g., 720, 730, and 740) are compared to performances (e.g., 750 and 760) of an ultra-massive MIMO system composed of 4 panels, wherein each panel has 100 elements on the TX and RX sides. In the examples of spectral efficiencies 750 and 760, the distance of separation between each panel is 32.73 cm when the TX gNB is at distance D=200 m apart from the RX gNB. In this "400×400" MIMO scenario, each antenna element is equipped with an RF chain. Hence, this 400×400 MIMO scenario requires a lot of power and is not considered as power efficient as the RIS-assisted 4×4 LoS MIMO channel 650 that requires four (4) RF chains at the TX gNB 602 (e.g., TX side) or RX gNB 604 (e.g., RX side). In each panel within the 400×400 MIMO system architecture, the antenna element separation is one-half wavelength, which is one-thousandth meter (i.e., λ\2=0.001 m). As a result, each antenna array at the TX and RX sides of the 400×400 MIMO system architecture is larger than each uniform linear array of the antenna sets 510 and 520 of the RIS-assisted 4×4 LoS MIMO system 600.

Additional technical advantages of the RIS-assisted LoS MIMO system 600 will now be described. At THz operation frequencies, the behavior of the of spectral efficiencies at low SNR values is a technical advantage because at high frequencies, having high SNR values is not always attainable. An example of the challenge to attain high SNR values when the operating frequency is in the THz range, refer to FIG. 7 with the atmospheric absorption and high path-loss attenuation.

The RIS-assisted LoS 4×4 MIMO system 600 at ground level gives the highest spectral efficiency 730 over different SNR levels. When the RIS 670 is positioned at a higher level than the ground level, the spectral efficiency 710-720 decreases (compared to 730) because the path is larger from the TX gNB 602 to the RIS 670 and has a wider angle compared to a setting where the RIS 670 is at ground level. Hence, as a technical advantage, the RIS controller's 660 function of determining the best height for the RIS 670 is a basis for and causes good spectral efficiency values.

As another technical solution, adding an RIS 670 is more energy efficiency than using many RF chains at the TX and RX side. At low SNR values (such as SNR<−25 dB) the RIS-assisted LoS MIMO system 600 outperforms the 400×400 MIMO system with water-filling, such as outperformance in terms of power allocation on the good channels.

Compared to the compared to the ultra-massive 400×400 MIMO, the RIS-assisted LoS MIMO system 600 provides flexibility by using a smaller antenna size and aperture. The RIS-assisted LoS MIMO system 600, by using fewer RF chains compared to the ultra-massive MIMO case, reduces power and provides sustainable solutions for future wireless systems. The graph 700 shows that the RIS-assisted LoS MIMO system 600 provides a good spectral efficiency 720-740 performance at low and higher SNR values. The RIS-assisted LoS MIMO system 600 provides a better performance (e.g., spectral efficiency 740) at $h_{RIS}=0$ meters compared to the performance (e.g., spectral efficiency 750) 400×400 MIMO system with water-filling. The behavior at different SNR levels can impact performance at THz operation frequencies. At SNR<−50 dB, the use of an RIS assisted LoS MIMO or massive MIMO converges to the performance of a SISO system (beamforming with one RF chain). Hence, the spectral efficiency of a system 600 that optimizes the RIS beam-steering vector is a flexible and sustainable solution at a THz frequency that can extend the range between TX and RX base stations while using compact and optimized spaced antenna arrays.

As introduced above, the RIS-assisted LoS MIMO system 600 is assisted by an RIS controller 660 that detects the wireless control signals from the transmitter (e.g., Tx gNB 602) and identifies the channel 650 and the phases in the transmitted signal 606. The RIS controller 660 is a device configures an optimization of the beam steering matrix (Φ). As a further technical advantage, the RIS controller 660 is a device that is additionally used in case of changes in the channel 650 itself due to misalignment or additional interference in the system (such as having changes in the channel model itself).

Figure 8:
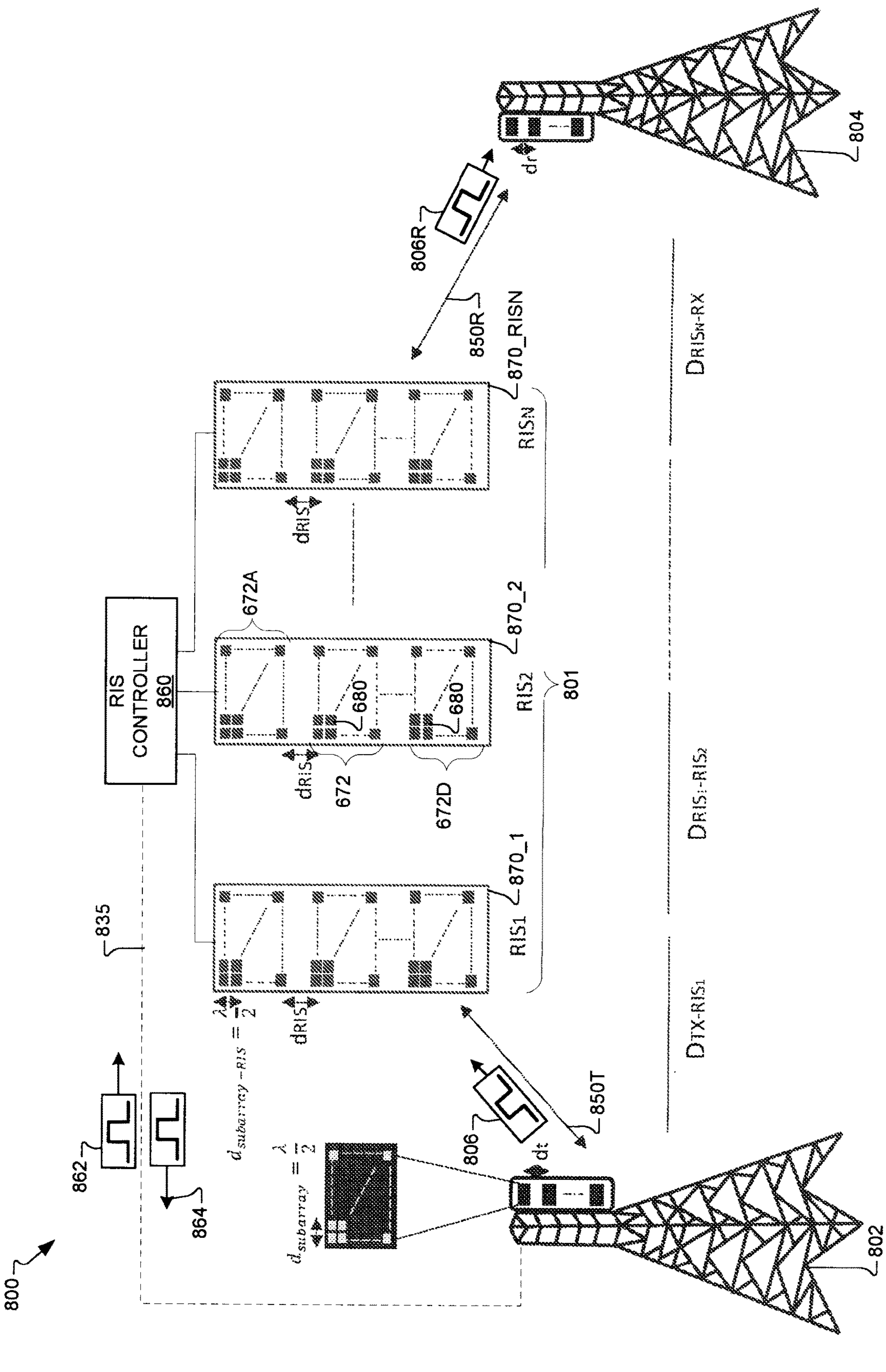
FIG. 8 illustrates an RIS-assisted LoS MIMO system in which the RIS system includes multiple RISs for range extension at THz frequencies according to embodiments of this disclosure.

FIG. 8 illustrates an RIS-assisted LoS MIMO system 800 in which the RIS system 801 includes multiple RISs for range extension at THz frequencies according to embodiments of this disclosure. The RIS-assisted LoS MIMO system 800 includes an RIS system 801, a Tx gNB 802, and an Rx gNB 804 that are similar to corresponding components 601, 602, and 604 within the system 600 of FIG. 6. As introduced above, the RIS system 801 includes a plurality of RISs 870_1 through 870_RISN. The embodiment of the system 800 shown in FIG. 8 is for illustration only, and other embodiments could be used without departing from the scope of this disclosure The transmitted signal 806, received signal 806*r*, network interface 835, initial segment 850*t* of the propagation channel 850, control signal 862, feedback control signal 864, and RIS controller 870 and their components are the same as or similar to the corresponding components 606, 606*r*, 635, 650*t*, 650, 662, 664, and 670 of FIG. 6. Each RIS 870 among the set of multiple RISs 670_1 through 670_RISN within the RIS system 801 are the same as or similar to the RIS 670 of FIG. 6. The distance $D_{TX\text{-}RIS_1}$, which defines the distance between the TX gNB 802 and a first RIS 870_1, can be the same as or similar the $D_{TX\text{-}RIS}$ of FIG. 6. The distance $D_{RIS_N\text{-}RX}$, which defines the distance between the last RIS 870_RISN and the RX gNB 804, can be the same as or similar the $D_{RIS\text{-}RX}$ of FIG. 6. The reflected signal 806*r*, which the RX gNB 804 receives from the last RIS 870_RISN, can be the same as or similar to the received signal 606*r* of FIG. 6. The ultimate channel 850*r* has transmitter and receiver ends at the last RIS 870_RISN and the RX gNB 804, respectively, and is analogous to the ultimate channel 650*r* of FIG. 6.

The RIS system 801 that extends a range between TX gNB 802 and RX gNB 804 farther than the 2×D range provided by the system 600 of FIG. 6. The architecture of the system 800 generally performs waveguiding of the signal 806 and steering the signal (in the form of a reflected signal 806*r*) to the intended receiver (e.g., RX gNB 804). In the system 800, range extension is limited by path-loss if the distances are very large.

When the transmitted signal 806 is incident upon the first RIS 870_1, a plurality of passive reflectors 680 configured within the RIS system 801 to reflect the incident EM transmitted signal 806 at predetermined phase such that a reflected signal 806*r* propagates toward the intended receiver, which is the RX gNB 804. More particularly, when the transmitted signal 806 is incident upon the first RIS 870_1, the plurality of passive reflectors 680 within the first RIS reflect (e.g., redirect) the impinging signal at a predetermined phase toward the intended receiver of the first RIS. In this example, the intended receiver of the first RIS is a second RIS 870_2. For ease of explanation, the signal that propagates from the first RIS to the second RIS is referred to as a first reflected signal. The distance $D_{RIS_1\text{-}RIS_2}$, which defines the distance between the first RIS 870_1 and the second RIS 870_2, also corresponds to the distance that the first reflected signal propagates through a first intermediate channel segment of the propagation channel 850.

In some embodiments, the second RIS 807_2 is the last RIS. However, in the embodiment shown, the second RIS 870_2 is an intermediate RIS, which has transmitter end at a previous RIS (870_1) and a receiver end at a next RIS (870_RISN). When the first reflected signal is incident upon the second RIS 870_2, the plurality of passive reflectors 680 within the second RIS reflect the impinging signal at a predetermined phase toward the intended receiver of the second RIS. In this example, the intended receiver of the second RIS is the last RIS 870_RISN. For ease of explanation, the signal that propagates from the second RIS to the last RIS is referred to as a second reflected signal. The distance $D_{RIS_2\text{-}RIS_N}$, which defines the distance between the second RIS 870_2 and the last RIS 870_RISN, also corresponds to the distance that the second reflected signal propagates through a second intermediate channel segment of the propagation channel 850.

When the second reflected signal is incident upon the last RIS 870_RISN, the plurality of passive reflectors 680 within the last RIS reflect the impinging signal at a predetermined phase toward the intended receiver of the last RIS. The Rx gNB 604 is the intended receiver of both the last RIS 870_RISN and the TX gNB 802. The signal that propagates from the last RIS to the RX gNB is the ultimate reflected signal 806*r*.

In the system 800, several RISs 870 at specified distances are incorporated into an LOS MIMO system (such as the system 600 of FIG. 6) to increase the range extension farther. The RIS system 801 is also referred to as a "multiple stacked RIS" and is located between the TX and RX gNBs 802 and 804, respectively. By being "stacked," the first RIS 870_redirects impinging signals at a predetermined phase toward the second RIS 970_2 and through an intermediate channel segment of a propagation channel. The RIS controller 860 carefully derives the number of RISs that can be stacked because the path-loss is a factor that can weaken the multi-reflected signal over very large distances. The RIS controller 860 is operably connected to and controls (e.g., by sending control signals) to each respective RIS 870_1 through 870_RISN. The RIS controller 860 executes optimization of each beam-steering matrix (Φ) corresponding to each respective RIS 870_1 through 870_RISN, which optimization might increase the complexity of the system.

Although FIG. 8 illustrates one example of an RIS-assisted LoS MIMO system 800, various changes may be made to FIG. 8. For example, various components in FIG. 8 could be combined, further subdivided, or omitted and additional components could be added according to particular needs. As a particular example, the plurality of RISs 870_1 through 870_RISN are not limited to an arrangement of being stacked in front of each other, as shown in FIG. 8, but instead can have an arrangement of having a mirrored RIS as shown in the RIS system 900 of FIG. 9.

Figure 9:
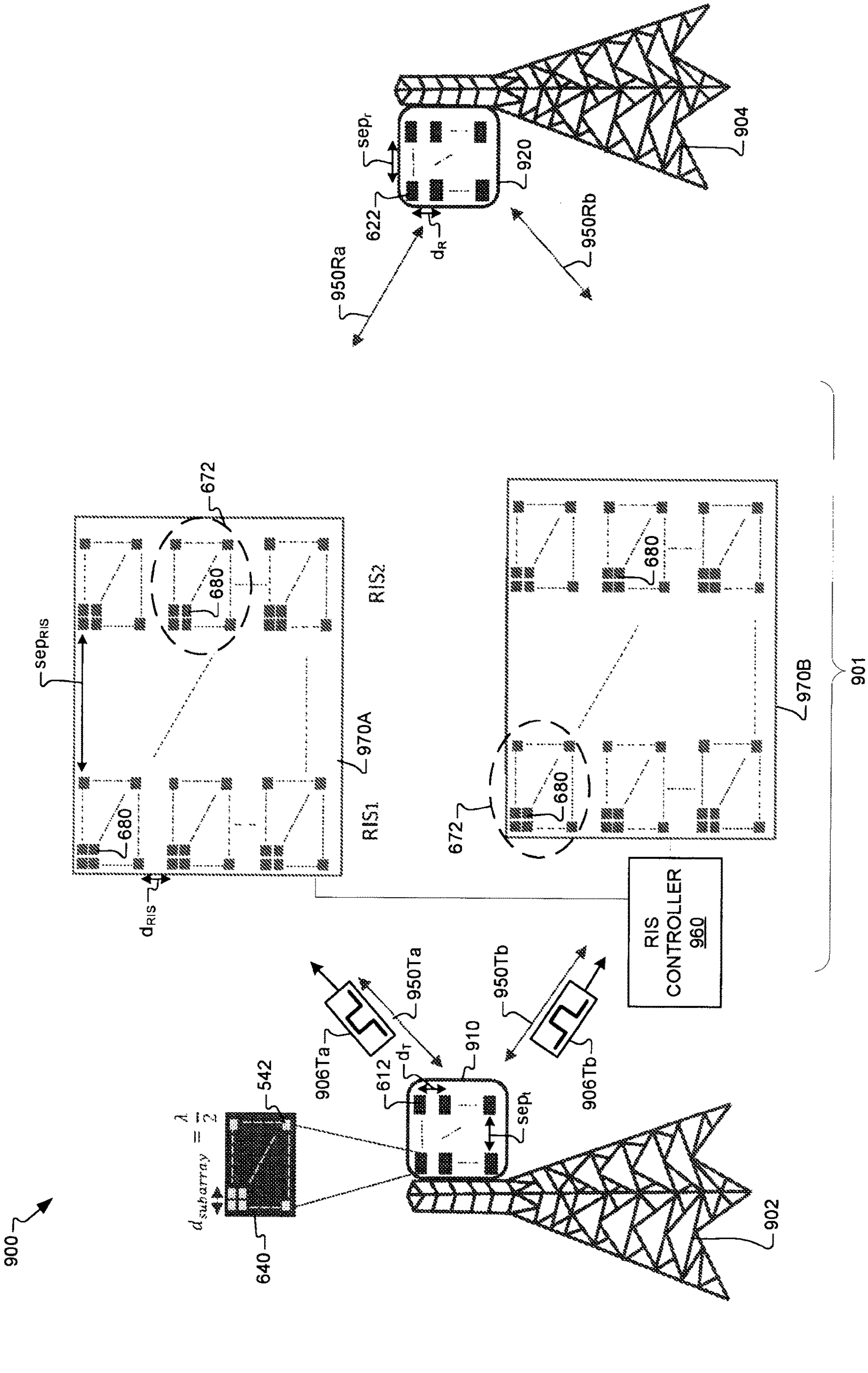
FIG. 9 illustrates an RIS-assisted LoS MIMO system for range extension at THz frequencies according to embodiments of this disclosure.
Figure 10:
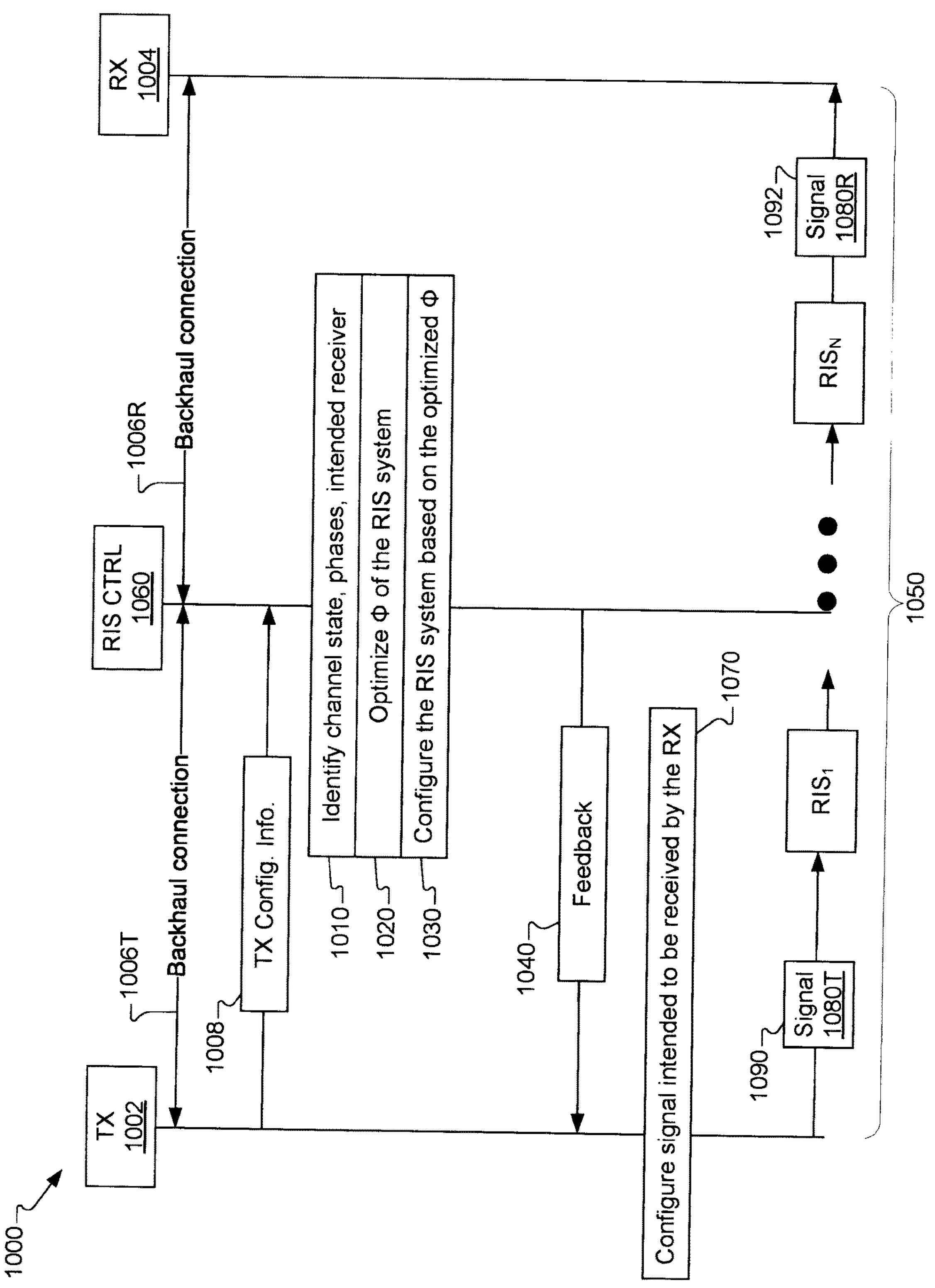
FIG. 10 illustrates a method for RIS-assisted LoS MIMO for range extension at THz in accordance with an embodiment of this disclosure.

FIG. 9 illustrates an RIS-assisted LoS MIMO system 900 for range extension at THz frequencies according to embodiments of this disclosure. The RIS-assisted LoS MIMO system 900 includes an RIS system 901 that can be the same as or similar to the RIS system 801 of FIG. 8. Also, the system 900 includes the Tx gNB 802 and Rx gNB 804 from FIG. 8. The $d_t$, $d_r$, $d_{RIS}$, antenna element 542, TX antenna panel 612, RX antenna panels 622, subarray 640, reflector panel 672, passive reflector 680, and their components of FIG. 9 are the same as or similar to the corresponding components of FIG. 6. The embodiment of the system 900 shown in FIG. 9 is for illustration only, and other embodiments could be used without departing from the scope of this disclosure As introduced above, the RIS system 901 includes an RIS controller 960, a first RIS 970*a*, and a second RIS 970*b* that is paired with the first RIS 970*a* as a mirrored RIS. Accordingly, each of the first RIS 970*a* and second RIS 970*b* is a mirrored RIS of the other. A mirrored RIS can facilitate guided transmission. The RIS system 901 shows an alternative placement of the second RIS 970*b* relative to the first RIS 970*a* such that the mirrored RISs 970*a*-970*b* are not "stacked," which means that the first RIS 970*a* does not redirect impinging signals 906Ta toward the second RIS 970*b*, and the second RIS 970*b* does not redirect impinging signals 906Tb toward the first RIS 970*a*. The architecture of the mirrored RIS system 901, in which the EM signal can be redirected from each of the mirrored RISs 970*a*-970*b* and beamformed toward the RX gNB 804. In other words, the initial channels 950Ta-950Tb and the ultimate channels 950Ra-950Rb corresponding to the pair of mirrored RISs 970*a*-970*b* share a transmitter end (i.e., TX gNB 902) and share a receiver end (i.e., RX gNB 904). This mirrored RIS system 901 strengthens the signal and maintains a good SNR level.

The RIS controller 960 is operably connected to and controls (e.g., by sending control signals) to each respective RIS 970*a*-970*b*. The RIS controller 860 executes optimization of each beam-steering matrix (Φ) corresponding to each respective RIS 970*a*-970*b*, which optimization might increase the complexity of the system, compared to the computational complexity of optimizing the Φ of the single RIS 670 of FIG. 6. The beam-steering matrix is re-evaluated such that the signals in the channels 950Ta-950Tb and 950Ra-950Rb remain orthogonal.

The RIS-assisted LoS MIMO system 900 scales up the number of TX-RX antennas for a higher multiplexing and diversity gains, compared to the systems 600 and 800 of FIGS. 6 and 8. An M×N uniform rectangular array is the arrangement of the TX antenna panels 612, RX antenna panels 622, and reflector panels 672 within the TX antenna set 910, RX antenna set 920, and each RIS among the mirrored RISs 970*a*-970*b*. In this example, the uniform rectangular arrays include four rows (M=4) and two columns (N=2), for example, each column (illustrated as "$RIS_1$" and "$RIS_2$") within the uniform rectangular array is an iteration of the uniform linear arrays within the TX antenna set 610, RX antenna set 620, and RIS 670 of FIG. 6. The distance between the antenna panels at the TX and RX side and the reflector panels 672 at the RISs are symmetrical ($sep_t$=$sep_r$=$sep_{RIS}$).

Although FIG. 9 illustrates one example of an RIS-assisted LoS MIMO system 900, various changes may be made to FIG. 9. For example, various components in FIG. 9 could be combined, further subdivided, or omitted and additional components could be added according to particular needs. As a particular example, the system 900 is not limited to the use of uniform planar arrays, and other different array topologies can be adopted at the TX, RX, and RISs. Examples of such other different array topologies include uniform linear array, circular array, non-uniform linear array, non-uniform planar arrays, etc.

FIG. 10 illustrates and method 1000 for RIS-assisted LoS MIMO for range extension at THz in accordance with an embodiment of this disclosure. The method 1000 is provided to extend the range of an LoS MIMO transmission at THz frequencies within a wireless channel by incorporating THz communications, LoS MIMO, and RIS surfaces technologies together in order to strategically design and place the RIS surfaces in the wireless channel and to maintain a full rank matrix for the wireless channel. The embodiment of the method 1000 shown in FIG. 10 is for illustration only, and other embodiments could be used without departing from the scope of this disclosure. The method 1000 is implemented by a wireless communication system that includes transmitter 1002, receiver 1004, and RIS controller 1060, such as any of the systems 600, 800, 900 of FIG. 6, 8, or 9. Each of the transmitter 1002, receiver 1004, and RIS controller 1060 is an electronic device, such as a gNB 102 of FIG. 2 or a UE 116 of FIG. 3. From FIG. 6, 8, or 9, respectively, the transmitter 1002 can be the TX gNB 602, 802, or 902; and the receiver 1004 can be the RX gNB 604, 804, or 904. The RIS controller 1060 can be the RIS controller 660 860, or 960 of FIG. 6, 8, or 9. More particularly, transmitter 1002, receiver 1004, and RIS controller 1060 portions of the method 1000 could be performed by the controller/processor 225 of the gNB 102 executing the applications 263. For ease of explanation, transmitter 1002 and receiver 1004 will be referred to as TX gNB 1002 and RX gNB 1004.

The method 1000 starts when the RIS controller 1060 establishes a connection 1006*t*, 1006*r* with the TX gNB 1002 and with the RX gNB 1004. The connection 1006*t*, 1006*r* can be wired or wireless backhaul connection via the network interface 235.

At block 1008, in order to transmit a signal 606, 806, 906Ta-906Tb to the RX gNB 1004, the TX gNB 1002 generates and sends transmission configuration information that is associated with a signal 1080 to-be-transmitted. In certain embodiments, the TX gNB 1002 transmits one or more wireless control signals containing the transmission configuration information. The RIS controller 1060 detects the one or more wireless control signals from the TX gNB 1002, obtains the transmission configuration information sent from the TX gNB 1002.

The signal 1080 can be any of the signals 606, 806, 906Ta-906Tb of FIGS. 6, 8, and 9. In certain embodiments, the signal 1080 is an inter-gNB signal, such as a control signal from one gNB to another gNB.

At block 1010, the RIS controller 1060 identifies a channel state and one or more phases based on the detected one or more wireless control signals. In certain embodiments, detection (e.g., receipt) of the one or more wireless control signals includes obtaining transmission configuration information that informs the RIS controller 1060 of the intended receiver of a signal 1080 to be transmitted.

At block 1020, the RIS controller 1060 optimizes a beam-steering reflection matrix (Φ) of the RIS system based on a singular value decomposition of channel matrices. Particularly, the RIS controller 1060 optimizes a respective beam-steering reflection matrix (Φ) for each RIS within the RIS system.

At block 1030, the RIS controller 1060 configures the RIS system based on the optimized beam-steering reflection matrix. Particularly, among the one or more RISs (illustrated as $RIS_1$, . . . $RIS_N$) within the RIS system, the RIS controller 1060 configures each RIS based on the corresponding respective reflection matrix Φ.

To redirect an incident EM signal toward an antenna array of an intended receiver of the RIS, each RIS includes a plurality of passive reflectors 680 configured to reflect the incident EM signal at predetermined phase such that the reflected signal propagates toward the intended receiver of that RIS. For example, the intended receiver of the first RIS ($RIS_1$) is the second RIS ($RIS_N$); the intended receiver of the last RIS ($RIS_N$) is the RX gNB 1004. In certain embodiments, the last RIS is the second RIS, but in other embodiments with 3 or more RISs, the intended receiver of the second RIS is a third RIS.

At block 1040, RIS controller 1060 generates a feedback signal based on the optimized reflection matrix and transmits the feedback signal back to the TX gNB 1002.

At block 1070, in response to receiving the feedback signal from the RIS controller 1060, the TX gNB 1002 configures the signal 1080 that is intended to be received by the RX gNB 1004. The signal 1080 refers to the signal 1080T transmitted from the TX gNB 1002 and refers to the signal 1080R received by the RX gNB 1004.

At block 1090, from an antenna array of the TX gNB 1002 transmits that signal 1080T at a wavelength (λ) in a direction toward a first RIS (illustrated as $RIS_1$) within the RIS system. The first RIS can be the RIS 670, 870_1, or the pair 970*a*-970*b* of FIGS. 6, 8, and 9, respectively. As shown in FIGS. 10, the RIS system can include one RIS or multiple RISs. The distance that the signal 1080 propagates through an initial channel segment of the channel 1050 is a LoS distance, such as D of FIG. 5, $D_{TX\text{-}RIS}$ of FIG. 6.

As block 1092, the RX gNB receives the signal 1080R from the RIS system, which guided that signal 1080 through a multi-segment propagation channel 1050 (e.g., channel 650, 850, 950 of FIG. 6, 8, or 9).

The RIS system, including RIS controller 1060 and the one or more RISs ($RIS_1$, . . . $RIS_N$) extend the range of an LoS MIMO transmission at THz frequencies within a wireless channel by incorporating THz communications, LoS MIMO, and RIS surfaces technologies together to strategically design and place the RIS surfaces in the wireless channel maintain a full rank matrix for the wireless channel.

Although FIG. 10 illustrates an example method for RIS-assisted LoS MIMO for range extension at THz, various changes may be made to FIG. 10. For example, while shown as a series of steps, various steps in FIG. 10 could overlap, occur in parallel, occur in a different order, or occur any number of times. As a particular example, the RIS system of this disclosure is not limited to waveguiding inter-gNB signals, but is also able to waveguide downlink signals to an intended receiver 1004 that is a UE. In such embodiments, the signal 1080 is a downlink signal from a gNB, and the receiver 1004 is a UE.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method implemented by a processor operably connected to a reconfigurable intelligent surface (RIS) system that includes one or more RISs, the method comprising:

detecting one or more wireless control signals from a transmitter;

identifying a channel state and one or more phases based on the detected one or more wireless control signals;

improving a beam-steering reflection matrix (Φ) of the RIS system based on a singular value decomposition of channel matrices; and configuring the RIS system based on the beam-steering reflection matrix, wherein the one or more RISs extend a range between the transmitter and a receiver base station, wherein among the one or more RISs, each RIS is configured to redirect an incident electromagnetic (EM) signal toward an antenna array of an intended receiver, each RIS includes a plurality of passive reflectors arranged such that an arrangement of the passive reflectors within the RIS includes a uniform linear array that includes a number (W) of reflector panels separated by a reflector panel separation distance ($d_{RIS}$) that is equivalent to an antenna panel separation distance ($d_t$) of the transmitter, the incident EM signal received from an antenna array of the transmitter at a wavelength (λ), and wherein:

in a vertical plane, a location of the RIS above ground differs from a vertical location ($h_t$) of the transmitter by a height placement value ($h_{RIS}$); and in a horizontal plane, the location of the RIS is a first distance ($D_{TX\text{-}RIS}$) from the transmitter and a second distance ($D_{RX\text{-}RIS}$) from the receiver base station.

2. The method of claim 1, wherein:

a first RIS is from among the one or more RISs;

the intended receiver of the first RIS is a second RIS among the one or more RISs; and the intended receiver of a last RIS among the one or more RISs is the receiver base station.

3. The method of claim 1, wherein:

the one or more RISs includes a first mirrored RIS that is among a pair of mirrored RISs that includes the first mirrored RIS and a second mirrored RIS.

4. The method of claim 1, wherein:

the RIS includes the plurality of passive reflectors configured to reflect the incident EM signal at a predetermined phase such that the reflected signal propagates toward the intended receiver; and the arrangement of the passive reflectors within the RIS is identical to an arrangement of a plurality of antenna elements of the antenna array of the transmitter.

5. The method of claim 4, wherein:

W antenna panels of the antenna array of the transmitter are separated by the antenna panel separation distance ($d_t$); and each of the W reflector panels includes at least one passive reflector.

6. The method of claim 5, wherein:

among the W reflector panels, a first reflector panel includes a subset of the plurality of passive reflectors arranged as a uniform planer subarray having $N_{sub}$ columns and $M_{sub}$ rows;

within each of the columns of the subarray, adjacent passive reflectors are separated from each other by a columnar separation distance ($d_{subarray\text{-}RIS}$);

among the W antenna panels, a first antenna panel includes a subset of the plurality of antenna elements arranged as an $N_{subX}M_{sub}$ uniform planer subarray in which adjacent antenna elements within a single row are separated from each other by a row-wise separation distance ($d_{subarray}$); and the $d_{subarray}$ and the $d_{subarray\text{-}RIS}$ are equivalent to half the wavelength $$\left(\frac{\lambda}{2}\right).$$

7. The method of claim 4, wherein the transmitter is a transmitter base station; and wherein the arrangement of the passive reflectors within the RIS includes at least one of:

a uniform rectangular array; or a circular array.

8. An apparatus comprising:

a reconfigurable intelligent surface (RIS) configured to:

redirect an incident electromagnetic (EM) signal toward an antenna array of an intended receiver that is a receiver base station, the incident EM signal received from an antenna array of a transmitter at a wavelength (2); and extend a range between the transmitter and a receiver base station, wherein:

the RIS includes a plurality of passive reflectors arranged such that an arrangement of the passive reflectors within the RIS includes a uniform linear array that includes a number (W) of reflector panels separated by a reflector panel separation distance ($d_{RIS}$) that is equivalent to an antenna panel separation distance ($d_t$) of the transmitter;

in a vertical plane, a location of the RIS above ground differs from a vertical location ($h_t$) of the transmitter by a height placement value ($h_{RIS}$); and in a horizontal plane, the location of the RIS is a first distance ($D_{TX\text{-}RIS}$) from the transmitter and a second distance ($D_{RX\text{-}RIS}$) from the receiver base station; and an RIS controller operably connected to the RIS, the RIS controller configured to:

detect one or more wireless control signals from the transmitter;

identify a channel state and one or more phases based on the one or more detected wireless control signals;

improve a beam-steering reflection matrix (Φ) of the RIS based on a singular value decomposition of channel matrices; and configure the RIS based on the beam-steering reflection matrix.

9. The apparatus of claim 8, wherein:

the RIS is a first RIS among a plurality of RISs that extend the range between the transmitter and the receiver base station;

the intended receiver of the first RIS is a second RIS among the plurality of RISs; and the intended receiver of a last RIS among the plurality of RISs is the receiver base station.

10. The apparatus of claim 8, wherein:

the RIS is a first mirrored RIS among a pair of mirrored RISs that includes the first mirrored RIS and a second mirrored RIS.

11. The apparatus of claim 8, wherein:

the RIS includes the plurality of passive reflectors configured to reflect the incident EM signal at a predetermined phase such that the reflected signal propagates toward the intended receiver; and the arrangement of the passive reflectors within the RIS is identical to an arrangement of a plurality of antenna elements of the antenna array of the transmitter.

12. The apparatus of claim 11, wherein:

W antenna panels of the antenna array of the transmitter are separated by the antenna panel separation distance ($d_t$); and each of the W reflector panels includes at least one passive reflector.

13. The apparatus of claim 12, wherein:

among the W reflector panels, a first reflector panel includes a subset of the plurality of passive reflectors arranged as a uniform planer subarray having $N_{sub}$ columns and $M_{sub}$ rows;

within each of the columns of the subarray, adjacent passive reflectors are separated from each other by a columnar separation distance ($d_{subarray\text{-}RIS}$);

among the W antenna panels, a first antenna panel includes a subset of the plurality of antenna elements arranged as an $N_{subX}M_{sub}$ uniform planer subarray in which adjacent antenna elements within a single row are separated from each other by a row-wise separation distance ($d_{subarray}$); and the $d_{subarray}$ and the $d_{subarray\text{-}RIS}$ are equivalent to half the wavelength $$\left(\frac{\lambda}{2}\right).$$

14. The apparatus of claim 11, wherein the transmitter is a transmitter base station; and wherein the arrangement of the passive reflectors within the RIS includes at least one of:

a uniform rectangular array; or a circular array.

15. A non-transitory computer readable medium embodying a computer program, the computer program comprising computer readable program code that when executed causes at least one processor to:

establish a connection to a reconfigurable intelligent surface (RIS) system that includes one or more RISs;

detect one or more wireless control signals from a transmitter;

identify a channel state and one or more phases based on the one or more detected wireless control signals;

improve a beam-steering reflection matrix (@) of the RIS system based on a singular value decomposition of channel matrices; and configure the RIS system based on the beam-steering reflection matrix, wherein the one or more RISs extend a range between the transmitter and a receiver base station, wherein among the one or more RISs, each RIS is configured to redirect an incident electromagnetic (EM) signal toward an antenna array of an intended receiver, each RIS includes a plurality of passive reflectors arranged such that an arrangement of the passive reflectors within the RIS includes a uniform linear array that includes a number (W) of reflector panels separated by a reflector panel separation distance ($d_{RIS}$) that is equivalent to an antenna panel separation distance ($d_t$) of the transmitter, the incident EM signal received from an antenna array of a transmitter at a wavelength ($\lambda$), and wherein:

in a vertical plane, a location of the RIS above ground differs from a vertical location ($h_t$) of the transmitter by a height placement value ($h_{RIS}$); and in a horizontal plane, the location of the RIS is a first distance ($D_{TX\text{-}RIS}$) from the transmitter and a second distance ($D_{RX\text{-}RIS}$) from the receiver base station.

16. The non-transitory computer readable medium of claim 15, wherein:

a first RIS is from among the one or more RISs;

the intended receiver of the first RIS is a second RIS among the one or more RISs; and the intended receiver of a last RIS among the one or more RISs is the receiver base station.

17. The non-transitory computer readable medium of claim 15, wherein:

the one or more RISs includes a first mirrored RIS that is among a pair of mirrored RISs that includes the first mirrored RIS and a second mirrored RIS.

18. The non-transitory computer readable medium of claim 15, wherein among the one or more RISs:

a first RIS includes a plurality of passive reflectors configured to reflect the incident EM signal at a predetermined phase such that the reflected signal propagates toward the intended receiver; and an arrangement of the passive reflectors within the first RIS is identical to an arrangement of a plurality of antenna elements of the antenna array of the transmitter.

19. The non-transitory computer readable medium of claim 18, wherein:

W antenna panels of the antenna array of the transmitter are separated by the antenna panel separation distance ($d_t$); and each of the W reflector panels includes at least one passive reflector.

20. The non-transitory computer readable medium of claim 19, wherein:

among the W reflector panels, a first reflector panel includes a subset of the plurality of passive reflectors arranged as a uniform planer subarray having $N_{sub}$ columns and $M_{sub}$ rows;

within each of the columns of the subarray, adjacent passive reflectors are separated from each other by a columnar separation distance ($d_{subarray\text{-}RIS}$);

among the W antenna panels, a first antenna panel includes a subset of the plurality of antenna elements arranged as an $N_{sub}XM_{sub}$ uniform planer subarray in which adjacent antenna elements within a single row are separated from each other by a row-wise separation distance ($d_{subarray}$); and the $d_{subarray}$ and the $d_{subarray\text{-}RIS}$ are equivalent to half the wavelength $$\left(\frac{\lambda}{2}\right).$$

* * * * *